(12) United States Patent
Park

(10) Patent No.: US 12,506,943 B2
(45) Date of Patent: Dec. 23, 2025

(54) CAMERA ACTUATOR AND CAMERA APPARATUS INCLUDING SAME

(71) Applicant: LG INNOTEK CO., LTD., Seoul (KR)

(72) Inventor: Dong Young Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 113 days.

(21) Appl. No.: 18/560,459

(22) PCT Filed: May 19, 2022

(86) PCT No.: PCT/KR2022/007170
§ 371 (c)(1),
(2) Date: Nov. 13, 2023

(87) PCT Pub. No.: WO2022/250376
PCT Pub. Date: Dec. 1, 2022

(65) Prior Publication Data
US 2024/0259659 A1    Aug. 1, 2024

(30) Foreign Application Priority Data
May 27, 2021    (KR) .......................... 10-2021-0068092

(51) Int. Cl.
*H04N 23/54*    (2023.01)
(52) U.S. Cl.
CPC .................................... *H04N 23/54* (2023.01)
(58) Field of Classification Search
None
See application file for complete search history.

(56) References Cited

U.S. PATENT DOCUMENTS

| 2013/0119785 | A1* | 5/2013 | Han | G02B 27/646 |
|---|---|---|---|---|
| | | | | 310/12.16 |
| 2020/0405129 | A1* | 12/2020 | Moyer | H01Q 9/00 |
| 2024/0397205 | A1* | 11/2024 | Wang | H04N 23/54 |

FOREIGN PATENT DOCUMENTS

| KR | 10-2017-0014504 | 2/2017 |
|---|---|---|
| KR | 10-2017-0117687 | 10/2017 |

(Continued)

OTHER PUBLICATIONS

Jang Young Bae; KR 10-2020-0055240; Actuator; May 21, 2020; English Translation; pp. 1-35 (Year: 2020).*

(Continued)

*Primary Examiner* — Cynthia Segura
(74) *Attorney, Agent, or Firm* — KED & ASSOCIATES, LLP

(57) ABSTRACT

As an embodiment of the present invention, a camera apparatus is disclosed, the apparatus including: a camera actuator; a main substrate; and an image sensor disposed between the camera actuator and the main substrate along the optical axis direction, wherein the main substrate includes: a first main substrate including a first surface having the image sensor mounted thereon and a second surface opposite to the first surface; and a connection substrate connected to the first main substrate, and wherein a groove is formed on one side surface of the first main substrate, the connection substrate is disposed in the groove, and the first main substrate includes an overlapping area in which a portion of the groove and the first surface overlap each other in the direction running from the second surface to the first surface.

20 Claims, 16 Drawing Sheets

(56) References Cited

FOREIGN PATENT DOCUMENTS

| KR | 10-2020-0055240 | | 5/2020 | |
|----|----|----|----|----|
| KR | 20200055240 A | * | 5/2020 | ........... H04N 5/2252 |
| KR | 10-2020-0117044 | | 10/2020 | |
| KR | 10-2021-0023195 | | 3/2021 | |
| KR | 20210023195 A | * | 3/2021 | ............. H04N 23/57 |
| KR | 10-2241321 | | 4/2021 | |

OTHER PUBLICATIONS

Lee et al. KR 10-2021-0023195; A Camera Module Including Printed Circuit Board and an Electronic Device Having the Same; Mar. 4, 2021; English Translation; pp. 1-24 (Year: 2021).*
International Search Report dated Aug. 18, 2022 issued in Application No. PCT/KR2022/007170.
Korean Office Action dated Jul. 22, 2025 issued in Application No. 10-2021-0068092.

* cited by examiner

CAMERA ACTUATOR AND CAMERA APPARATUS INCLUDING SAME

CROSS-REFERENCE TO RELATED PATENT APPLICATIONS

This application is a U.S. National Stage Application under 35 U.S.C. §371 of PCT Application No. PCT/KR2022/007170, filed May 19, 2022, which claims priority to Korean Patent Application No. 10-2021-0068092, filed May 27, 2021, whose entire disclosures are hereby incorporated by reference.

TECHNICAL FIELD

The present invention relates to a camera actuator and a camera apparatus including the same.

BACKGROUND ART

A camera is a device for making pictures or videos by photographing subjects and is mounted on a mobile device, a drone, a vehicle, or the like. A camera apparatus or a camera module may have an image stabilization (IS) function of correcting or preventing the image shake caused by a user's motion, an auto focusing (AF) function of aligning a focal length of a lens by automatically adjusting a distance between an image sensor and the lens, and a zooming function of capturing a remote subject by increasing or decreasing the magnification of the remote subject through a zoom lens in order to improve the quality of the image.

Meanwhile, a pixel density of the image sensor increases as a resolution of the camera increases, and thus a size of the pixel becomes smaller, and as the pixel becomes smaller, the amount of light received for the same time decreases. Therefore, as the camera has a higher pixel density, the image shake caused by hand shaking due to a shutter speed decreased in a dark environment may more severely occur. As a representative IS technique, there is an optical image stabilizer (OIS) technique of correcting motion by changing a path of light.

According to a general OIS technique, the motion of the camera may be detected through a gyro sensor or the like, and a lens or camera apparatus including a lens and an image sensor may tilt or move based on the detected motion. When the lens or camera apparatus including the lens and the image sensor tilts or moves for an OIS function, it is necessary to additionally secure a space for tilting or moving around the lens or camera apparatus.

Meanwhile, an actuator for an OIS may be disposed around the lens. In this case, the actuator for an OIS may include actuators, which are in charge of two axes perpendicular to an optical axis (Z), that is, an actuator in charge of an X-axis tilting and an actuator in charge of a Y-axis tiling.

However, according to the needs of ultra-slim and ultra-small camera apparatus, there is a large space constraint for arranging the actuator for an OIS, and it may be difficult to ensure a sufficient space where the lens or camera apparatus including the lens and the image sensor itself may tilt or move for an OIS function. In addition, as the camera has a higher pixel density, it is preferable that a size of the lens be increased to increase the amount of received light, and there may be a limit to increasing the size of the lens due to a space occupied by the actuator for an OIS.

In addition, when the zooming function, the AF function, and the OIS function are all included in the camera apparatus, there is a problem that an OIS magnet and an AF or zoom magnet are disposed close to each other to cause magnetic field interference.

In addition, there is a problem in that a thickness of the camera module increases and a tolerance increases when a circuit substrate to be connected to an external electronic device and the like is bent.

Technical Problem

The present invention is directed to providing a camera apparatus in which a circuit substrate unit is bent once to provide an area in which a connector is disposed in order to improve reliability, the ease of assembly, and the like.

In addition, the present invention is also directed to providing a camera apparatus, which secures a space for connection of an image sensor without increasing a thickness of a camera module through grooves of rigid circuit substrates disposed on both surfaces of a flexible circuit substrate.

In addition, the present invention is also directed to providing a camera actuator and a camera apparatus applicable to ultra-slim, ultra-small, and high-resolution cameras.

In addition, the present invention is also directed to providing a camera actuator and a camera apparatus, in which a moving distance of a lens assembly is properly adjusted through a shape of a driving coil.

The objects of embodiments are not limited thereto and may also include objects or effects that may be identified from the configurations or embodiments to be described below.

Technical Solution

A camera apparatus according to an embodiment of the present invention includes a camera actuator, a main substrate, and an image sensor disposed between the camera actuator and the main substrate in an optical axis direction, wherein the main substrate includes a first main substrate including a first surface on which the image sensor is mounted and a second surface opposite to the first surface, and a connection substrate connected to the first main substrate, a groove is formed in one side surface of the first main substrate, the connection substrate is disposed in the groove, and the first main substrate includes an overlapping area in which the first surface and a portion of the groove overlap each other in a direction from the second surface to the first surface.

The connection substrate may be spaced apart from the overlapping area inside the groove.

The overlapping area of the first surface may not overlap the second surface in the direction from the second surface to the first surface.

One side surface of the overlapping area may be disposed colinearly with the one side surface of the first main substrate.

A horizontal width of the first surface of the first main substrate may be greater than a vertical width thereof.

An area of the first surface of the first main substrate may be greater than an area of the second surface.

The connection substrate may be formed integrally with a flexible substrate of the first main substrate.

A width of the flexible substrate of the first main substrate may be greater than a width of the connection substrate.

A camera apparatus according to an embodiment of the present invention includes a camera actuator, a main substrate, and an image sensor disposed between the camera actuator and the main substrate in an optical axis direction, wherein the main substrate includes a first rigid substrate, a second rigid substrate, and a flexible substrate disposed between the first rigid substrate and the second rigid substrate, the flexible substrate includes a first flexible area and a second flexible area, the second flexible area of the flexible substrate is exposed at the second rigid substrate, and the second flexible area overlaps a portion of the first rigid substrate in a direction from the second rigid substrate to the first rigid substrate.

A gap may be formed between the exposed first flexible area or second flexible area of the flexible substrate and the first rigid substrate.

A width of the exposed second flexible area of the flexible substrate may be greater than a width of the first flexible area.

A camera apparatus according to an embodiment of the present invention includes a camera actuator, a main substrate, and an image sensor disposed between the camera actuator and the main substrate in an optical axis direction, wherein the main substrate includes a first rigid substrate, a second rigid substrate, and a flexible substrate disposed between the first rigid substrate and the second rigid substrate, the first rigid substrate includes a first groove, the second rigid substrate includes a second groove of which at least a portion corresponds to the first groove, the first rigid substrate includes a protrusion protruding toward the first groove, the protrusion and the flexible substrate are disposed to be spaced apart from and face each other, and the flexible substrate is exposed through the second groove.

The first rigid substrate may include a first surface, and the second rigid substrate may include a second surface facing the first surface.

At least a portion of the first rigid substrate may be exposed through the first groove.

The flexible substrate may extend from a bottom surface of the second groove.

At least a portion of the flexible substrate may be disposed to be spaced apart from the first rigid substrate in the optical axis direction.

The main substrate may include a first bonding layer in contact with the first rigid substrate and the flexible substrate.

The first bonding layer may not be disposed in a separation space positioned between the flexible substrate and the first rigid substrate in the optical axis direction.

At least a portion of the first bonding layer may not overlap the first groove in the optical axis direction.

Advantageous Effects

According to the present invention, it is possible to implement a camera apparatus in which a circuit substrate unit is bent once to provide an area in which a connector is disposed in order to improve reliability, the ease of assembly, and the like.

In addition, according to the present invention, it is possible to implement a camera apparatus, which secures a space for connection of an image sensor without increasing a thickness of a camera module through grooves of rigid circuit substrates disposed on both surfaces of a flexible circuit substrate.

In addition, by reducing an area in which electrical connection between substrates is made in a camera apparatus including a plurality of actuators, it is possible to simplify a bonding process.

In addition, it is possible to implement a camera apparatus of which a bonding process is improved by forming bonding grooves (e.g., pads) in both surfaces thereof.

In addition, it is possible to implement a camera actuator and a camera apparatus applicable to ultra-slim, ultra-small, and high-resolution cameras.

In particular, it is possible to effectively arrange an actuator for an OIS even without increasing the entire size of the camera apparatus.

According to the embodiments of the present invention, it is possible to implement an X-axis tilting and a Y-axis tilting with a stable structure without causing magnetic field interference when the X-axis tilting and the Y-axis tilting are performed and prevent magnetic field interference by an AF actuator or zoom actuator, thereby achieving a precise OIS function.

According to the present invention, it is possible to implement a camera actuator and a camera apparatus applicable to ultra-slim, ultra-small, and high-resolution cameras.

Various and beneficial advantages and effects of the present invention are not limited to the above-described contents and will be more readily understood in a process of describing specific embodiments of the present invention.

MODES OF THE INVENTION

Figure 1:
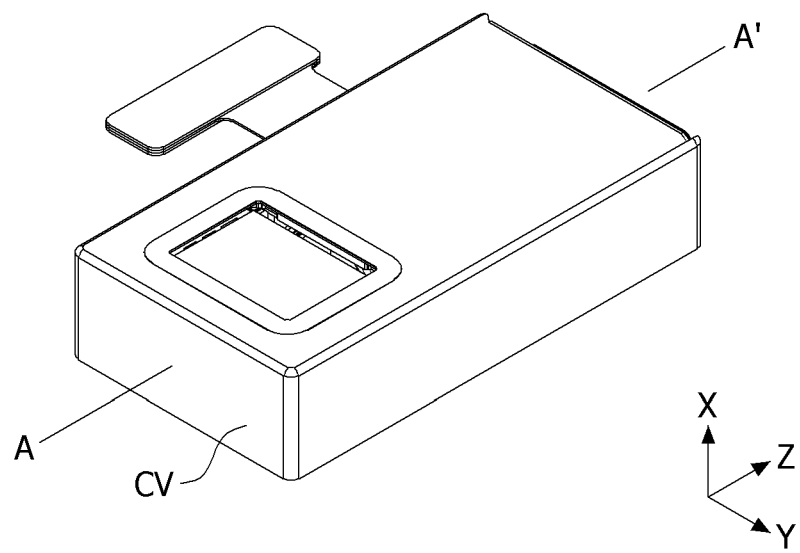
FIG. 1 is a perspective view of a camera apparatus according to an embodiment.

Since the present invention may have various changes and various embodiments, specific embodiments are illustrated and described in the accompanying drawings.

However, it should be understood that this is not intended to limit the present invention to specific embodiments and includes all modifications, equivalents, and substitutes included in the spirit and technical scope of the present invention.

Terms including ordinal numbers such as second or first may be used to describe various components, but the components are not limited by the terms. The terms are used only for the purpose of distinguishing one component from another. For example, a second component may be referred to as a first component, and similarly, the first component may also be referred to as the second component without departing from the scope of the present invention. The term "and/or" includes a combination of a plurality of related listed items or any of the plurality of related listed items.

When a first component is described as being "connected" or "coupled" to a second component, it should be understood that the first component may be directly connected or coupled to the second component or a third component may be present therebetween. On the other hand, when the first component is described as being "directly connected" or "directly coupled" to the second component, it should be understood that the third component is not present therebetween.

The terms used in the application are only used to describe specific embodiments and are not intended to limit the present invention. The singular expression includes the plural expression unless the context clearly dictates otherwise. In the application, it should be understood that terms "comprise" and "have" are intended to specify that a feature, a number, a step, an operation, a component, a part, or a combination thereof described in the specification is present, but do not preclude the possibility of the presence or addition of one or more other features, numbers, steps, operations, components, parts, or combinations thereof.

Unless defined otherwise, all terms used herein, including technical or scientific terms, have the same meaning as commonly understood by those of ordinary skill in the art to which the present invention pertains. Terms such as those defined in a commonly used dictionary should be construed as having a meaning consistent with the meaning in the context of the related art and should not be construed in an ideal or excessively formal meaning unless explicitly defined in the application.

Hereinafter, embodiments will be described in detail with reference to the accompanying drawings, and the same or corresponding components are denoted by the same reference numeral regardless of the reference numerals, and overlapping descriptions thereof will be omitted.

Figure 2:
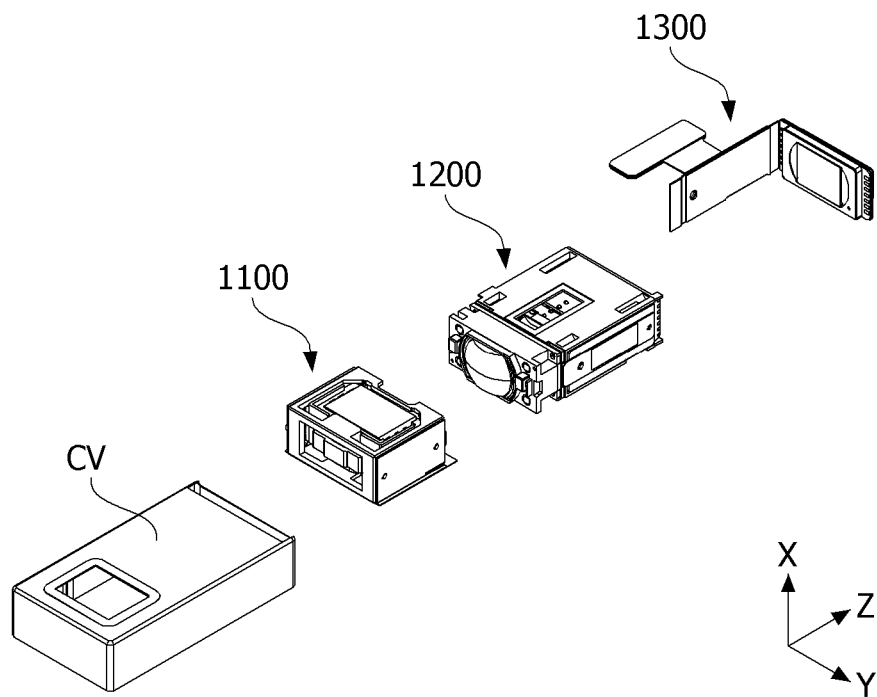
FIG. 2 is an exploded perspective view of the camera apparatus according to the embodiment.
Figure 3:
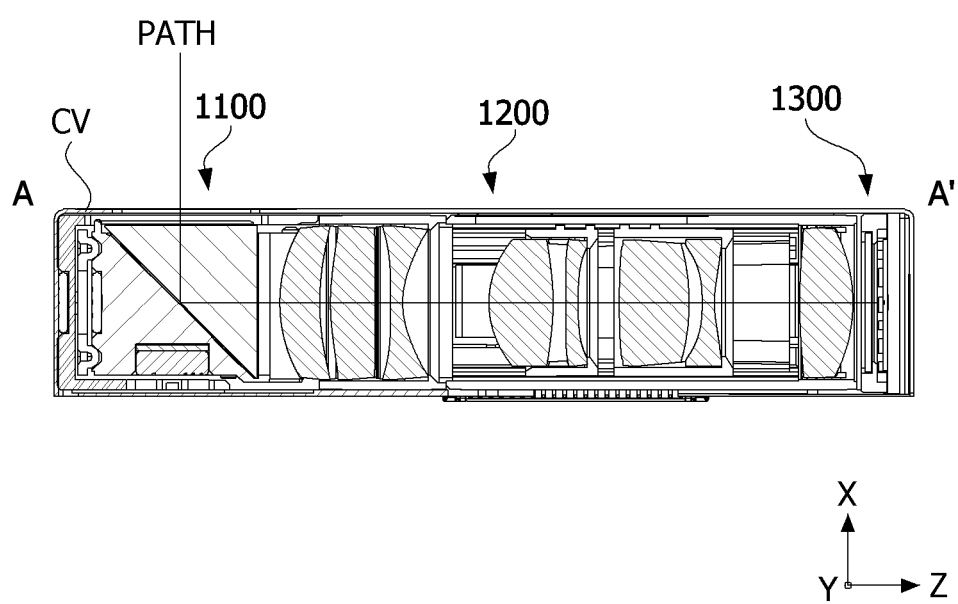
FIG. 3 is a cross-sectional view along line A-A' in FIG. 1.

FIG. 1 is a perspective view illustrating a camera apparatus according to an embodiment, FIG. 2 is an exploded perspective view of the camera apparatus according to the embodiment, and FIG. 3 is a cross-sectional view along line A-A' in FIG. 1.

Referring to FIGS. 1 and 2, a camera apparatus 1000 according to the embodiment may include a cover CV, a first camera actuator 1100, a second camera actuator 1200, and a circuit substrate 1300. Here, the first camera actuator 1100 may be used interchangeably with "first actuator," and the second camera actuator 1200 may be used interchangeably with "second actuator."

The cover CV may cover the first camera actuator 1100 and/or the second camera actuator 1200. It is possible to increase a coupling strength between the first camera actuator 1100 and the second camera actuator 1200 by the cover CV.

Furthermore, the cover CV may be made of a material that blocks electromagnetic waves. Therefore, it is possible to easily protect the first camera actuator 1100 and the second camera actuator 1200 in the cover CV.

In addition, the first camera actuator 1100 may be an optical image stabilizer (OIS) actuator.

In the embodiment, the first camera actuator 1100 may change an optical path. In the embodiment, the first camera actuator 1100 may vertically change the optical path through an internal optical member (e.g., a prism or mirror). With this configuration, even when a thickness of a mobile terminal decreases, a lens component that is larger than the thickness of the mobile terminal is disposed in the mobile terminal so that magnification, auto focusing (AF), and OIS functions may be performed through the change in the optical path.

The first camera actuator 1100 may change the optical path from a first direction to a third direction. In the specification, an optical axis direction is a third direction or Z-axis direction and corresponds to a traveling direction of light provided to an image sensor.

Additionally, the first camera actuator 1100 may include a lens disposed in a predetermined barrel (not illustrated). For example, the lens may include a fixed focal length lens. The fixed focal length lens may be referred to as "single focal length lens" or "single lens."

The second camera actuator 1200 may be disposed at a rear end of the first camera actuator 1100. The second camera actuator 1200 may be coupled to the first camera actuator 1100. In addition, the mutual coupling may be performed by various methods.

In addition, the second camera actuator 1200 may be a zooming actuator or AF actuator. For example, the second camera actuator 1200 may support one or more lenses and perform an AF function or zooming function by moving the lenses according to a predetermined control signal of a control unit.

The circuit substrate 1300 may be disposed at a rear end of the second camera actuator 1200. The circuit substrate 1300 may be electrically connected to the second camera actuator 1200 and the first camera actuator 1100. In addition, a plurality of circuit substrates 1300 may be provided.

The circuit substrate 1300 may be connected to a second housing of the second camera actuator 1200 and may be provided with an image sensor. Furthermore, a base unit including a filter may be seated on the circuit substrate 1300. A description thereof will be made below.

The camera apparatus according to the embodiment may be formed as one camera apparatus or a plurality of camera apparatuses. For example, the plurality of camera apparatuses may include a first camera apparatus and a second camera apparatus. In addition, as described above, the camera apparatus may be used interchangeably with "camera module," "camera apparatus," "imaging device," "imaging module," "imaging machine," or the like.

In addition, the first camera apparatus may include one actuator or a plurality of actuators. For example, the first camera apparatus may include the first camera actuator 1100 and the second camera actuator 1200.

In addition, the second camera apparatus may include an actuator (not illustrated) disposed in a predetermined housing (not illustrated) and capable of driving a lens unit. Although the actuator may be a voice coil motor, a micro actuator, a silicon actuator, or the like and applied in various methods such as an electrostatic method, a thermal method, a bimorph method, and an electrostatic force method, the present invention is not limited thereto. In addition, in the specification, the camera actuator may be referred to as "actuator" or the like. In addition, the camera apparatus formed of the plurality of camera apparatuses may be mounted in various electronic devices such as a mobile terminal.

Referring to FIG. 3, the camera apparatus according to the embodiment may include the first camera actuator 1100 for performing the OIS function and the second camera actuator 1200 for performing the zooming function and the AF function.

Light may enter the camera apparatus through an opening area positioned in an upper surface of the first camera actuator 1100. In other words, the light may enter the first camera actuator 1100 in an optical axis direction (e.g., an X-axis direction), and the optical path may be changed in a vertical direction (e.g., a Z-axis direction) through the optical member. In addition, the light may pass through the second camera actuator 1200 and enter an image sensor IS positioned at one end of the second camera actuator 1200 (PATH).

In the specification, a lower surface refers to one side in a first direction. In addition, the first direction is the X-axis direction in the drawings and may be used interchangeably with a second axis direction or the like. A second direction is a Y-axis direction in the drawings and may be used interchangeably with a first axis direction or the like. The second direction is a direction perpendicular to the first direction. In addition, a third direction is the Z-axis direction in the drawings and may be used interchangeably with a third axis direction or the like. The third direction is perpendicular to both the first direction and the second direction. Here, the third direction (Z-axis direction) corresponds to the optical axis direction, the first direction (X-axis direction) and the second direction (Y-axis direction) are directions perpendicular to an optical axis, and tilting may be performed by the second camera actuator. A detailed description thereof will be made below. In addition, hereinafter, the optical axis direction corresponds to the optical path and in particular, the optical axis direction is the third direction (Z-axis direction) in the description of the first camera actuator 1100 and the second camera actuator 1200, and the first camera actuator 1100 and the second camera actuator 1200 will be described below based on this.

In addition, with this configuration, the camera apparatus according to the embodiment may resolve the spatial limitations of the first camera actuator and the second camera actuator by changing the optical path. In other words, the camera apparatus according to the embodiment may extend the optical path while minimizing the thickness of the camera apparatus in response to the change in the optical path. Furthermore, it should be understood that the second camera actuator may provide a wide range of magnification by controlling a focus or the like in the extended optical path.

In addition, the camera apparatus according to the embodiment may implement an OIS function by controlling the optical path through the first camera actuator, thereby minimizing the occurrence of a decentering or tilting phenomenon and providing the best optical characteristics.

Furthermore, the second camera actuator 1200 may include an optical system and a lens driving unit. For example, at least one of a first lens assembly, a second lens assembly, a third lens assembly, and a guide pin may be disposed in the second camera actuator 1200.

In addition, the second camera actuator 1200 may include a coil and a magnet and perform a high-magnification zooming function.

For example, although the first lens assembly and the second lens assembly may be moving lenses that move through the coil, the magnet, and the guide pin, and the third lens assembly may be a fixed lens, the present invention is not limited thereto. For example, the third lens assembly may perform a function of a focator using which light forms an image at a specific position, and the first lens assembly may perform a function of a variator for re-forming an image formed by the third lens assembly, which is the focator, at another position. Meanwhile, the first lens assembly may be in a state in which a magnification change is large because a distance to a subject or an image distance is greatly changed, and the first lens assembly, which is the variator, may play an important role in a focal length or magnification change of the optical system. Meanwhile, imaging points of an image formed by the first lens assembly, which is the variator, may be slightly different depending on a position. Therefore, the second lens assembly may perform a position compensation function for the image formed by the variator. For example, the second lens assembly may perform a function of a compensator to accurately form an image at an actual position of the image sensor using the imaging points of the image formed by the first lens assembly which is the variator. For example, the first lens assembly and the second lens assembly may be driven by an electromagnetic force generated by the interaction between the coil and the magnet. The above description may be applied to a lens assembly to be described below.

Meanwhile, when the OIS actuator and the AF/zoom actuator are disposed according to the embodiment of the present invention, it is possible to prevent the magnetic field interference by an AF or zoom magnet when an OIS is driven. Since a first driving magnet of the first camera actuator 1100 is disposed separately from the second camera actuator 1200, it is possible to prevent the magnetic field interference between the first camera actuator 1100 and the second camera actuator 1200. In the specification, an OIS function may be used interchangeably with terms such as hand shaking correction, optical image stabilization, optical image correction, or shaking correction.

Figure 4:
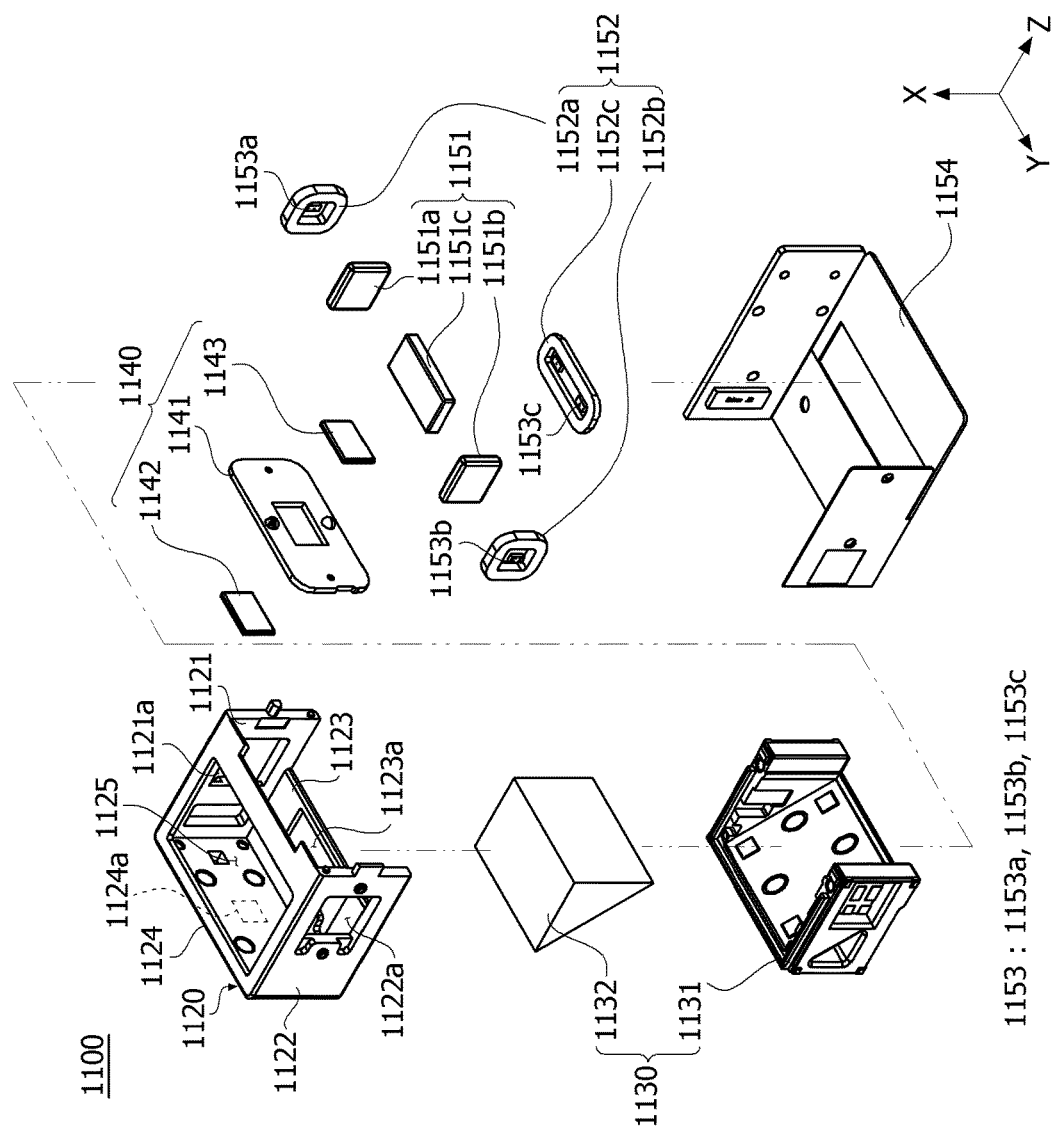
FIG. 4 is an exploded perspective view of a first camera actuator according to the embodiment.

FIG. 4 is an exploded perspective view of a first camera actuator according to the embodiment.

Referring to FIG. 4, the first camera actuator 1100 according to the embodiment includes a first shield can (not illustrated), a first housing 1120, a mover 1130, a rotating unit 1140, and a first driving unit 1150.

The mover 1130 may include a holder 1131 and an optical member 1132 seated on the holder 1131. In addition, the rotating unit 1140 includes a rotating plate 1141, a first magnetic part 1142 having a coupling strength with the rotating plate 1141, and a second magnetic part 1143 positioned in the rotating plate 1141. In addition, the first driving unit 1150 includes a driving magnet 1151, a driving coil 1152, a Hall sensor unit 1153, and a first substrate unit 1154.

The first shield can (not illustrated) may be positioned at an outermost side of the first camera actuator 1100 to surround the rotating unit 1140 and the first driving unit 1150, which will be described below.

The first shield can (not illustrated) can block or attenuate electromagnetic waves generated from the outside. Therefore, it is possible to reduce the number of malfunctions in the rotating unit 1140 or the first driving unit 1150.

The first housing 1120 may be positioned inside the first shield can (not illustrated). In addition, the first housing 1120 may be positioned inside the first substrate unit 1154 to be described below. The first housing 1120 may be fastened by being fitted into or matched with the first shield can (not illustrated).

The first housing 1120 may have a plurality of housing side portions. The first housing 1120 may include a first housing side portion 1121, a second housing side portion 1122, a third housing side portion 1123, and a fourth housing side portion 1124.

The first housing side portion 1121 and the second housing side portion 1122 may be disposed to face each other. In addition, the third housing side portion 1123 and the fourth housing side portion 1124 may be disposed between the first housing side portion 1121 and the second housing side portion 1122.

The third housing side portion 1123 may be in contact with the first housing side portion 1121, the second housing side portion 1122, and the fourth housing side portion 1124. In addition, the third housing side portion 1123 may be a lower side portion of the first housing 1120 and may include a lower surface.

In addition, the first housing side portion 1121 may include a first housing hole 1121a. A first coil 1152a to be described below may be positioned in the first housing hole 1121a.

In addition, the second housing side portion 1122 may include a second housing hole 1122a. In addition, a second coil 1152b to be described below may be positioned in the second housing hole 1122a.

The first coil 1152a and the second coil 1152b may be coupled to the first substrate unit 1154. In the embodiment, the first coil 1152a and the second coil 1152b may be electrically connected to the first substrate unit 1154 so that a current may flow therebetween. The current is an element of an electromagnetic force capable of tilting the first camera actuator with respect to the X-axis.

In addition, the third housing side portion 1123 may include a third housing hole 1123a. A third coil 1152c to be described below may be positioned in the third housing hole 1123a. The third coil 1152c may be coupled to the first substrate unit 1154. In addition, the third coil 1152c may be electrically connected to the first substrate unit 1154 so that a current may flow therebetween. The current is an element of an electromagnetic force capable of tilting the first camera actuator with respect to a Y-axis.

The fourth housing side portion 1124 may include a first housing groove 1124a. The first magnetic part 1142 to be described below may be disposed in an area facing the first housing groove 1124a. Therefore, the first housing 1120 may be coupled to the rotating plate 1141 by a magnetic force or the like.

In addition, the first housing groove 1124a according to the embodiment may be positioned on an inner surface or an outer surface of the fourth housing side portion 1124. Therefore, the first magnetic part 1142 may be disposed to correspond to a position of the first housing groove 1124a.

In addition, the first housing 1120 may include an accommodating part 1125 formed by the first to fourth housing side portions 1121 to 1124. The mover 1130 may be positioned in the accommodating part 1125.

The mover 1130 may include the holder 1131 and the optical member 1132 seated on the holder 1131.

The holder 1131 may be seated in the accommodating part 1125 of the first housing 1120. The holder 1131 may include a first prism outer surface to a fourth prism outer surface respectively corresponding to the first housing side portion 1121, the second housing side portion 1122, the third housing side portion 1123, and the fourth housing side portion 1124.

A seating groove in which the second magnetic part 1143 may be seated may be disposed in the fourth prism outer surface facing the fourth housing side portion 1124.

The optical member 1132 may be seated on the holder 1131. To this end, the holder 1131 may have a seating surface, and the seating surface may be formed by an accommodating groove. The optical member 1132 may include a reflector disposed therein. However, the present invention is not limited thereto. In addition, the optical member 1132 may reflect light reflected from the outside (e.g., an object) into the camera apparatus. In other words, the optical member 1132 can resolve spatial limits of the first camera actuator and the second camera actuator by changing the path of the reflected light. Therefore, it should be understood that the camera apparatus may provide a wide range of magnification by extending the optical path while a thickness thereof is minimized.

The rotating unit 1140 includes the rotating plate 1141, the first magnetic part 1142 having the coupling strength with the rotating plate 1141, and the second magnetic part 1143 positioned in the rotating plate 1141.

The rotating plate 1141 may be coupled to the mover 1130 and the first housing 1120. The rotating plate 1141 may include an additional magnetic part (not illustrated) positioned therein.

In addition, the rotating plate 1141 may be disposed adjacent to the optical axis. Therefore, the actuator according to the embodiment may easily change the optical path according to first-axis tilting and second-axis tilting to be described below.

The rotating plate 1141 may include first protruding portions disposed to be spaced apart from each other in the first direction (X-axis direction) and second protruding portions disposed to be spaced apart from each other in the second direction (Y-axis direction). In addition, the first protruding portion and the second protruding portion may protrude in opposite directions. A detailed description thereof will be made below.

In addition, the first magnetic part 1142 includes a plurality of yokes, and the plurality of yokes may be positioned to face each other based on the rotating plate 1141. In the embodiment, the first magnetic part 1142 may include a plurality of facing yokes. In addition, the rotating plate 1141 may be positioned between the plurality of yokes.

As described above, the first magnetic part 1142 may be positioned in the first housing 1120. In addition, as described above, the first magnetic part 1142 may be seated on the inner surface or outer surface of the fourth housing side portion 1124. For example, the first magnetic part 1142 may be seated in a groove formed in the outer surface of the fourth housing side portion 1124. Alternatively, the first magnetic part 1142 may be seated in the first housing groove 1124a.

In addition, the second magnetic part 1143 may be positioned on the mover 1130, particularly, an outer surface of the holder 1131. With this configuration, the rotating plate 1141 may be easily coupled to the first housing 1120 and the mover 1130 by the coupling strength generated by a magnetic force between the second magnetic part 1143 and the first magnetic part 1142 disposed therein. In the present invention, the positions of the first magnetic part 1142 and the second magnetic part 1143 may be changed.

The first driving unit 1150 includes the first driving magnet 1151, the first driving coil 1152, the first Hall sensor unit 1153, and the first substrate unit 1154.

The first driving magnet 1151 may include a plurality of magnets. In the embodiment, the first driving magnet 1151 may include a first magnet 1151a, a second magnet 1151b, and a third magnet 1151c.

The first magnet 1151a, the second magnet 1151b, and the third magnet 1151c may each be positioned on the outer surface of the holder 1131. In addition, the first magnet 1151a and the second magnet 1151b may be positioned to face each other. In addition, the third magnet 1151c may be positioned on a lower surface of the outer surface of the holder 1131. A detailed description thereof will be made below.

The first driving coil 1152 may include a plurality of coils. In the embodiment, the first driving coil 1152 may include a first coil 1152a, a second coil 1152b, and a third coil 1152c.

The first coil 1152a may be positioned to face the first magnet 1151a. Therefore, as described above, the first coil 1152a may be positioned in the first housing hole 1121a of the first housing side portion 1121.

In addition, the second coil 1152b may be positioned to face the second magnet 1151b. Therefore, as described above, the second coil 1152b may be positioned in the second housing hole 1122a of the second housing side portion 1122.

The first coil 1152a may be positioned to face the second coil 1152b. In other words, the first coil 1152a may be symmetrically disposed with the second coil 1152b with respect to the first direction (X-axis direction). This may be applied to the first magnet 1151a and the second magnet 1151b in the same manner. In other words, the first magnet 1151a and the second magnet 1151b may be symmetrically disposed with respect to the first direction (X-axis direction). In addition, at least portions of the first coil 1152a, the second coil 1152b, the first magnet 1151a, and the second magnet 1151b may be disposed to overlap in the second direction (Y-axis direction). With this configuration, the X-axis tilting may be accurately performed without being biased to one side by the electromagnetic force between the first coil 1152a and the first magnet 1151a and the electromagnetic force between the second coil 1152b and the second magnet 1151b.

The third coil 1152c may be positioned to face the third magnet 1151c. Therefore, as described above, the third coil 1152c may be positioned in the third housing hole 1123a of the third housing side portion 1123. The third coil 1152c may generate an electromagnetic force with the third magnet 1151c so that the mover 1130 and the rotating unit 1140 may perform a Y-axis tilting based on the first housing 1120.

Here, an X-axis tilting is a tilting with respect to the X-axis, and a Y-axis tilting is a tilting with respect to the Y-axis.

The first Hall sensor unit 1153 may include a plurality of Hall sensors. The Hall sensor corresponds to and is used interchangeably with "sensor unit" to be described below. In the embodiment, the first Hall sensor unit 1153 may include a first Hall sensor 1153a, a second Hall sensor 1153b, and a third Hall sensor 1153c.

The first Hall sensor 1153a may be positioned inside the first coil 1152a. In addition, the second Hall sensor 1153b may be disposed symmetrically with the first Hall sensor 1153a in the first direction (X-axis direction) and the third direction (Z-axis direction). In addition, the second Hall sensor 1153b may be positioned inside the second coil 1152b.

The first Hall sensor 1153a may detect a change in magnetic flux inside the first coil 1152a. In addition, the second Hall sensor 1153b may detect a change in magnetic flux in the second coil 1152b. Therefore, it is possible to perform position sensing between the first and second magnets 1151a and 1151b and the first and second Hall sensors 1153a and 1153b. The first camera actuator according to the embodiment may more accurately control the X-axis tilting by detecting the position through, for example, the first and second Hall sensors 1153a and 1153b.

In addition, the third Hall sensor 1153c may be positioned inside the third coil 1152c. The third Hall sensor 1153c may detect a change in magnetic flux inside the third coil 1152c. Therefore, it is possible to perform position sensing between the third magnet 1151c and the third Hall sensor 1153c. Therefore, the first camera actuator according to the embodiment may control the Y-axis tilting. At least one of the first to third Hall sensors may be provided.

The first substrate unit 1154 may be positioned under the first driving unit 1150. The first substrate unit 1154 may be electrically connected to the first driving coil 1152 and the first Hall sensor unit 1153. For example, the first substrate unit 1154 may be coupled to the first driving coil 1152 and the first Hall sensor unit 1153 by a surface mount technology (SMT). However, the present invention is not limited to this method.

The first substrate unit 1154 may be positioned between the first shield can (not illustrated) and the first housing 1120 and coupled to the first shield can and the first housing 1120. The coupling method may be variously performed as described above. In addition, through the coupling, the first driving coil 1152 and the first Hall sensor unit 1153 may be positioned in an outer surface of the first housing 1120.

The first substrate unit 1154 may include a circuit substrate having line patterns that may be electrically connected, such as a rigid printed circuit board (rigid PCB), a flexible PCB, or a rigid-flexible PCB. However, the present invention is not limited to these types.

Figure 5:
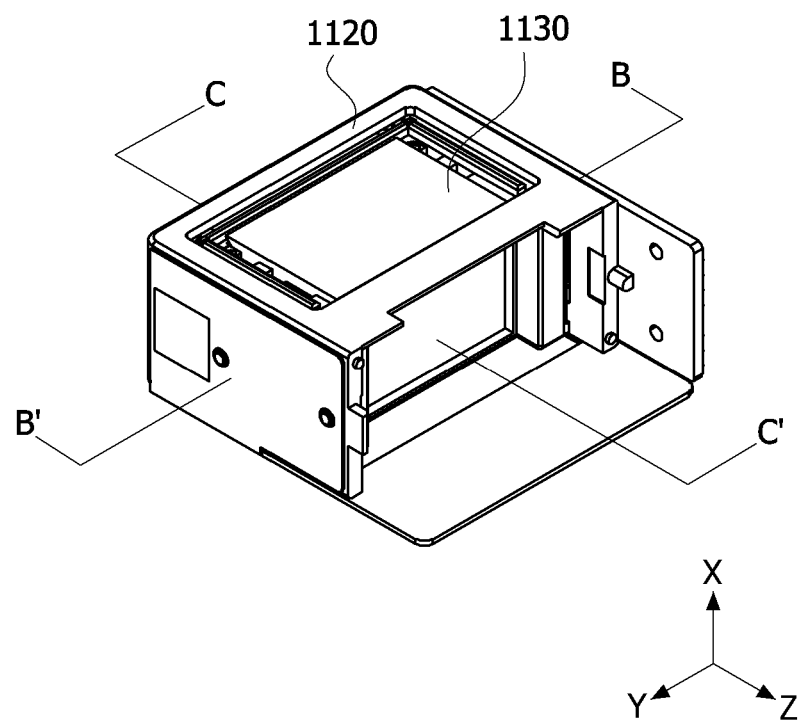
FIG. 5 is a perspective view of the first camera actuator according to the embodiment from which a first shield can and a substrate are removed.
Figure 6:
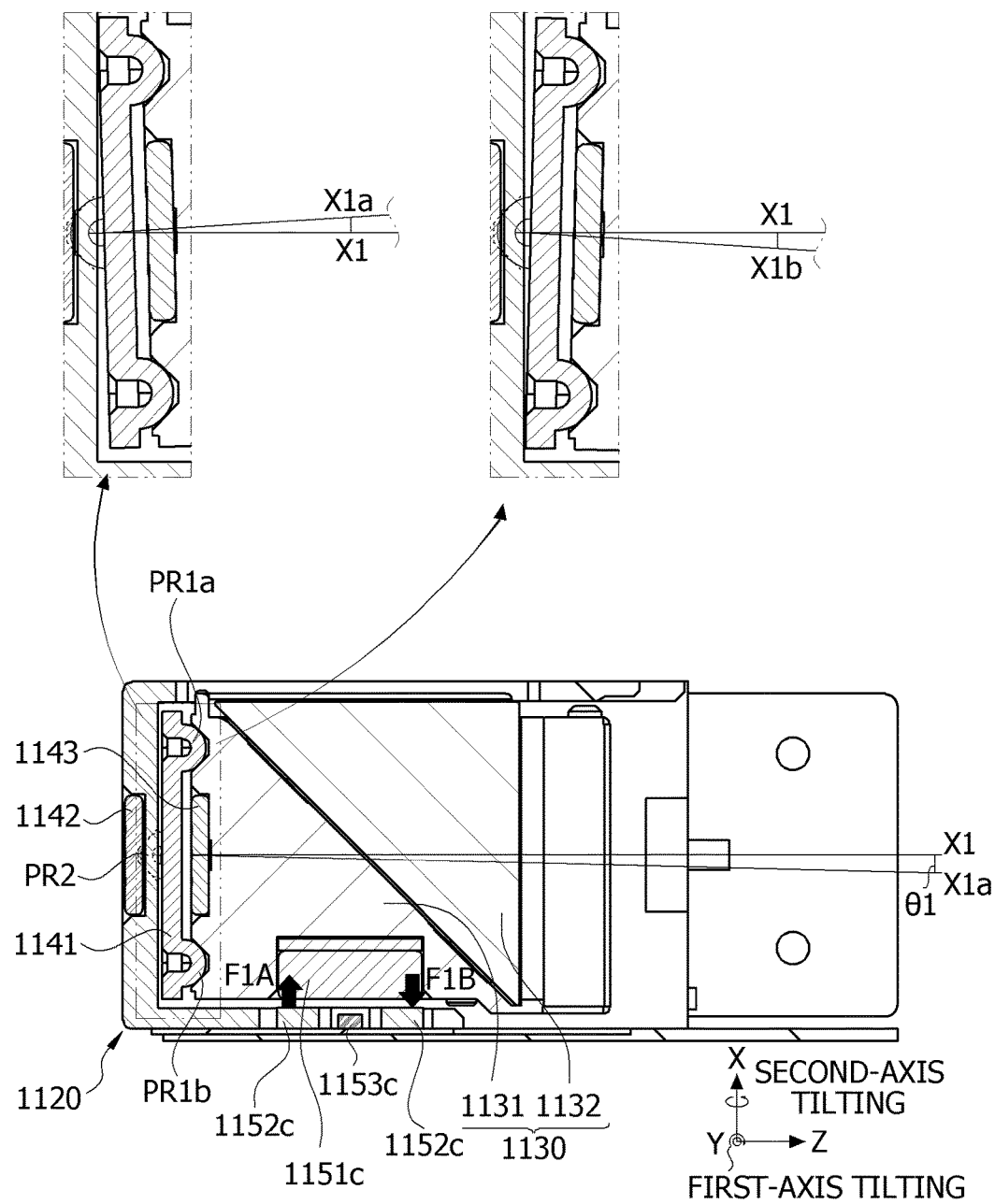
FIG. 6 is a cross-sectional view along line B-B' in FIG. 5.
Figure 7:
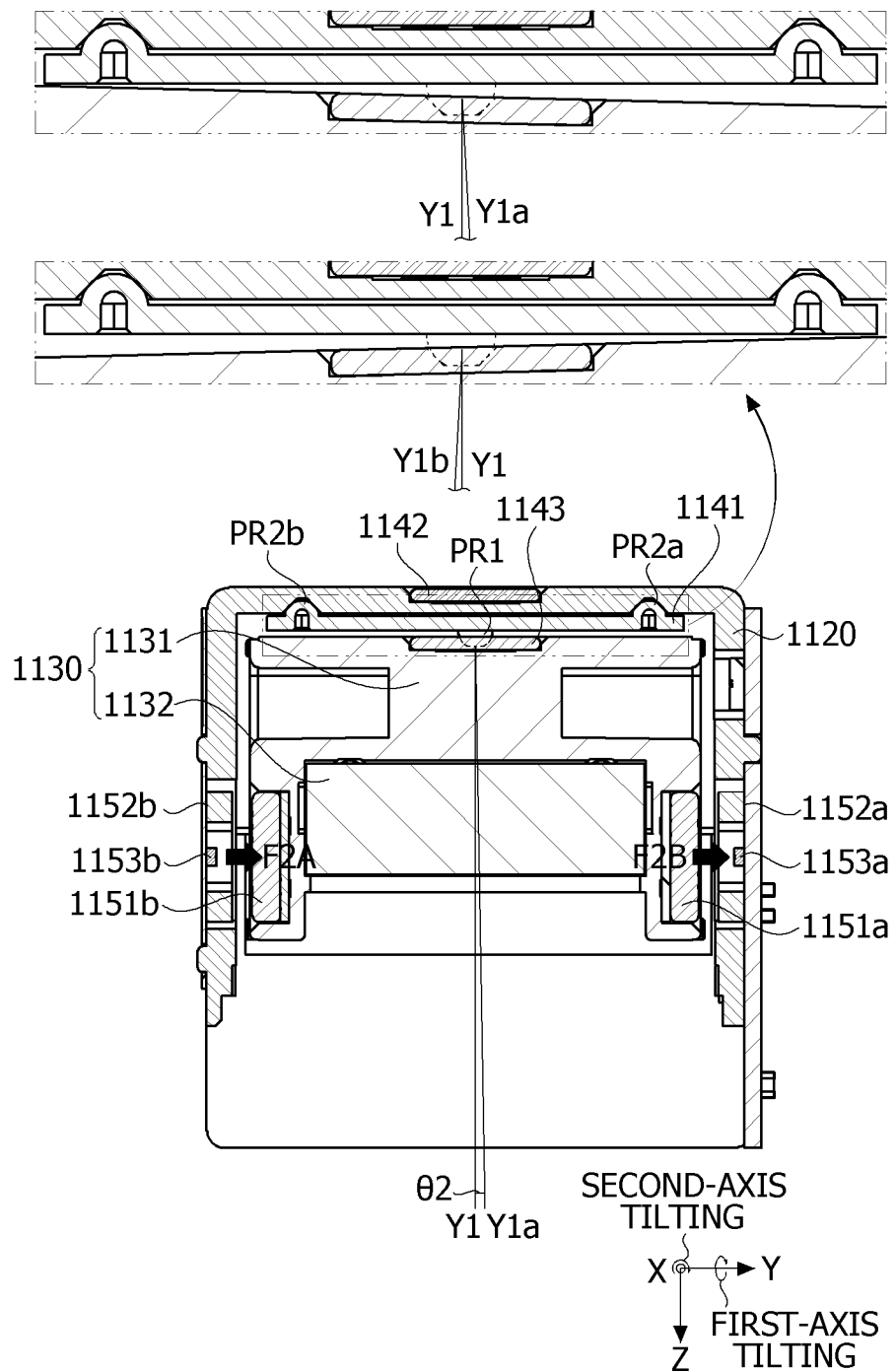
FIG. 7 is a cross-sectional view along line C-C' in FIG. 5.

FIG. 5 is a perspective view of the first camera actuator according to the embodiment from which a first shield can and a substrate are removed, FIG. 6 is a cross-sectional view along line B-B' in FIG. 5, and FIG. 7 is a cross-sectional view along line C-C' in FIG. 5.

Referring to FIGS. 5 to 7, the first coil 1152a may be positioned on the first housing side portion 1121.

In addition, the first coil 1152a and the first magnet 1151a may be positioned to face each other. At least a portion of the first magnet 1151a may overlap the first coil 1152a in the second direction (Y-axis direction).

In addition, the second coil 1152b may be positioned on the second housing side portion 1122. Therefore, the second coil 1152b and the second magnet 1151b may be positioned to face each other. At least a portion of the second magnet 1151b may overlap the second coil 1152b in the second direction (Y-axis direction).

In addition, the first coil 1152a and the second coil 1152b may overlap each other in the second direction (Y-axis direction). In addition, the first magnet 1151a and the second magnet 1151b may overlap each other in the second direction (Y-axis direction). With this configuration, the electromagnetic force applied to the outer surfaces of the holder (the first holder outer surface and the second holder outer surface) may be positioned on an axis parallel to the second direction (Y-axis direction) so that the X-axis tilting may be performed accurately and precisely.

In addition, a first accommodating groove (not illustrated) may be positioned in the fourth holder outer surface. In addition, first protrusions PR1a and PR1b may be disposed in the first accommodating groove. Therefore, when the X-axis tilting is performed, the first protrusions PR1a and PR1b may each serve as a reference axis (or rotation axis) of the tilting. Therefore, the rotating plate 1141 and the mover 1130 may move laterally.

As described above, the second protruding portion PR2 may be seated in a groove of an inner surface of the fourth housing side portion 1124. In addition, when the Y-axis tilting is performed, the rotating plate and the mover may be rotated using the second protruding portion PR2 as a reference axis of the Y-axis tilting.

According to the embodiment, an OIS function may be performed by the first protruding portion and the second protruding portion.

Referring to FIG. 6, the Y-axis tilting may be performed. In other words, an OIS function can be implemented by rotation in the first direction (X-axis direction).

In the embodiment, the third magnet 1151c disposed under the holder 1131 may generate the electromagnetic force with the third coil 1152c to tilt or rotate the mover 1130 in the first direction (X-axis direction).

Specifically, the rotating plate 1141 may be coupled to the first housing 1120 and the mover 1130 by the first magnetic part 1142 in the first housing 1120 and the second magnetic part 1143 in the mover 1130. In addition, the first protruding portions PR1 may be spaced apart from each other in the first direction (X-axis direction) and supported by the first housing 1120.

In addition, the rotating plate 1141 may be rotated or tilted using the second protruding portion PR2 protruding toward the mover 1130 as a reference axis (or a rotation axis). In other words, the rotating plate 1141 may perform the Y-axis tilting using the second protruding portion PR2 as the reference axis.

For example, an OIS function can be implemented by rotating (X1→X1a or X1b) the mover 130 at a first angle θ1 in the X-axis direction by first electromagnetic forces F1A and F1B between the third magnet 1151c disposed in the third seating groove and the third coil 1152c disposed on the third substrate side portion. The first angle θ1 may be in a range of ±1° to ±3°. However, the present invention is not limited thereto.

Hereinafter, in the first camera actuators according to various embodiments, the electromagnetic force may move the mover by generating a force in the described direction or move the mover in the described direction even when a force is generated in another direction. In other words, the described direction of the electromagnetic force is a direction of the force generated by the magnet and the coil to move the mover.

Referring to FIG. 7, the X-axis tilting may be performed. In other words, an OIS function can be implemented by rotation in the second direction (Y-axis direction).

The OIS function can be implemented by tilting or rotating (or X-axis tilting) the mover 1130 in the Y-axis direction.

In the embodiment, the first magnet 1151a and the second magnet 1151b disposed in the holder 1131 may tilt or rotate the rotating plate 1141 and the mover 1130 in the second direction (Y-axis direction) by generating the electromagnetic force with the first coil 1152a and the second coil 1152b, respectively.

The rotating plate 1141 may be rotated or tilted (X-axis tilting) in the second direction using the first protruding portion PR1 as a reference axis (or a rotation axis).

For example, an OIS function can be implemented by rotating (Y1→Y1a, Y1b) the mover 130 at a second angle θ2 in the Y-axis direction by second electromagnetic forces F2A and F2B between the first and second magnets 1151a and 1151b disposed in the first seating groove and the first and second coils 1152a and 1152b disposed on the first and second substrate side portions. The second angle θ2 may be in a range of ±1° to ±3°. However, the present invention is not limited thereto.

In addition, as described above, the electromagnetic forces generated by the first and second magnets 1151a and 1151b and the first and second coils 1152a and 1152b may act in the third direction or a direction opposite to the third direction. For example, the electromagnetic force may be generated on a left side portion of the mover 1130 in the third direction (Z-axis direction) and may act on a right side portion of the mover 1130 in a direction opposite to the third direction (Z-axis direction). Therefore, the mover 1130 may be rotated with respect to the first direction. Alternatively, the mover 130 may be moved in the second direction.

As described above, the first camera actuator according to the embodiment may control the rotating plate 1141 and the mover 1130 to be rotated in the first direction (X-axis direction) or the second direction (Y-axis direction) by the electromagnetic force between the first driving magnet in the holder and the first driving coil disposed in the housing, thereby minimizing the occurrence of a decentering or tilting phenomenon and providing the best optical characteristics upon implementing the OIS function. In addition, as described above, "Y-axis tilting" may correspond to rotating or tilting in the first direction (X-axis direction). In addition, "X-axis tilting" may correspond to rotating or tilting in the second direction (Y-axis direction).

Figure 8:
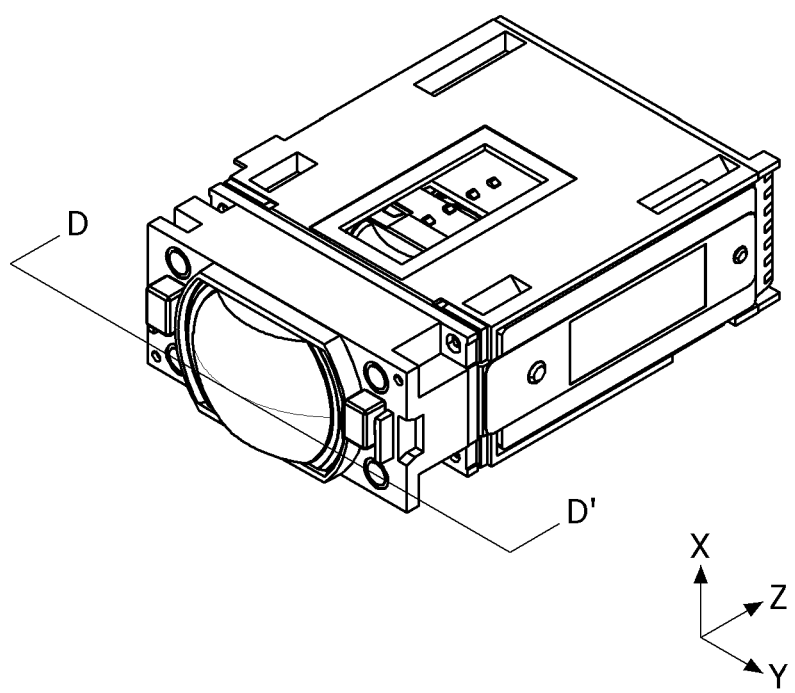
FIG. 8 is a perspective view of a second camera actuator according to the embodiment.
Figure 9:
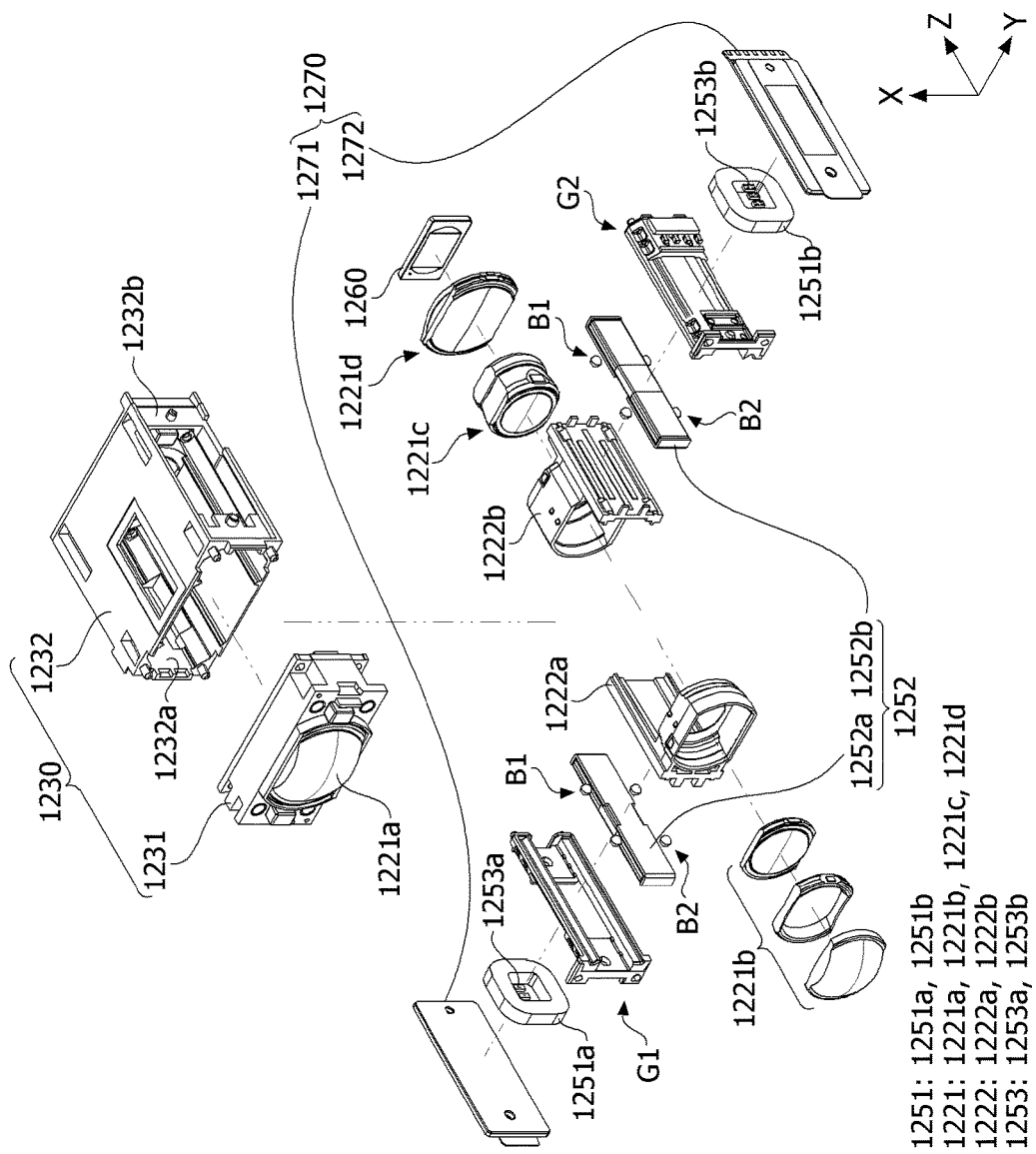
FIG. 9 is an exploded perspective view of the second camera actuator according to the embodiment.
Figure 10:
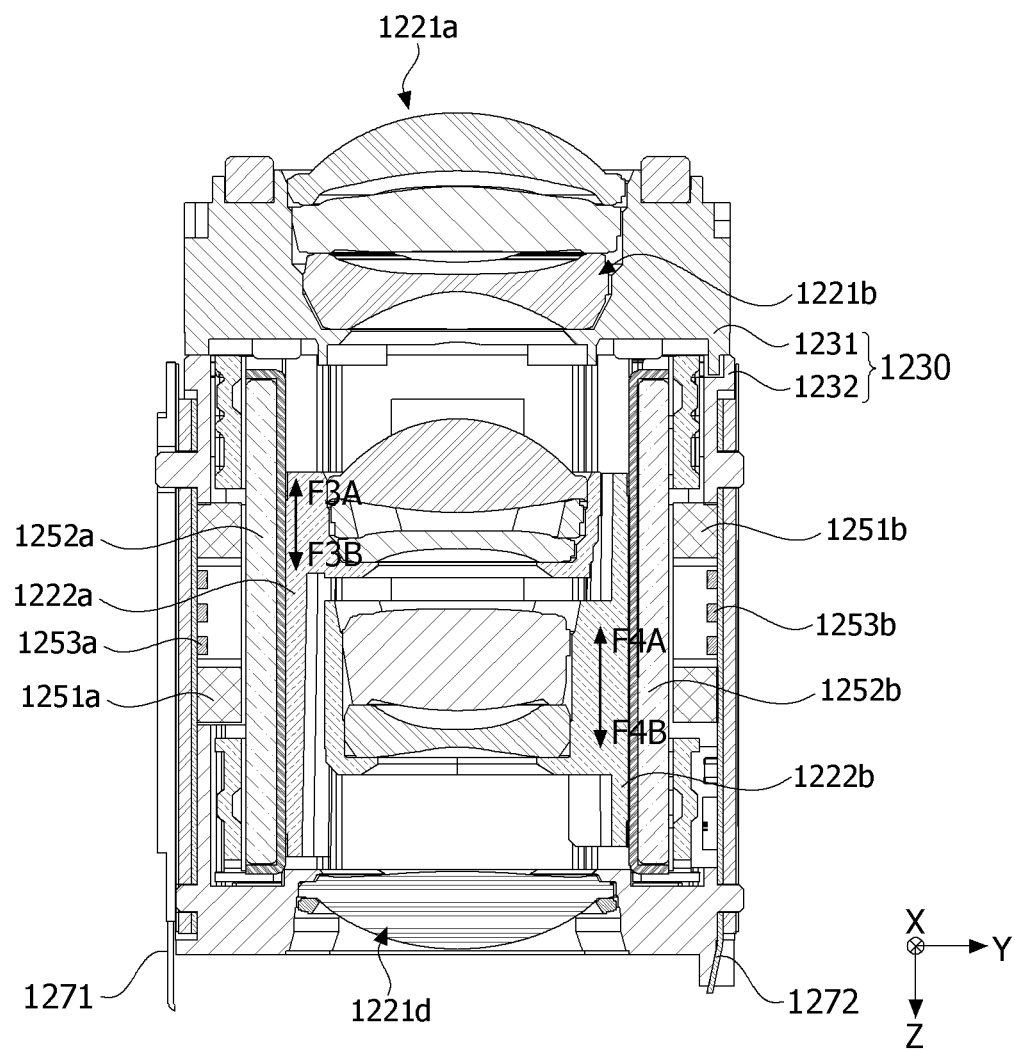
FIG. 10 is a cross-sectional view along line D-D' in FIG. 8.

FIG. 8 is a perspective view of a second camera actuator according to an embodiment, FIG. 9 is an exploded perspective view of the second camera actuator according to the embodiment, and FIG. 10 is a cross-sectional view along line D-D' in FIG. 8.

Referring to FIGS. 8 to 10, the second camera actuator 1200 according to the embodiment may include a lens unit 1220, a second housing 1230, a second driving unit 1250, a base unit 1260, a second substrate unit 1270, and a bonding member 1280. Furthermore, the second camera actuator 1200 may further include a second shield can (not illustrated), an elastic unit (not illustrated), and a bonding member (not illustrated).

The second shield can (not illustrated) may be positioned in one area (e.g., an outermost side) of the second camera actuator 1200 and positioned to surround the components (the lens unit 1220, the second housing 1230, the second driving unit 1250, the base unit 1260, the second substrate unit 1270, and an image sensor (IS)) to be describe below.

The second shield can (not illustrated) can block or attenuate electromagnetic waves generated from the outside. Therefore, it is possible to reduce the number of malfunctions in the second driving unit 1250.

The lens unit 1220 may be positioned in the second shield can (not illustrated). The lens unit 1220 may move in the third direction (Z-axis direction or optical axis direction). Therefore, the above-described AF function or zooming function can be performed.

In addition, the lens unit 1220 may be positioned in the second housing 1230. Therefore, at least a portion of the lens unit 1220 may move in the second housing 1230 in the optical axis direction or the third direction (Z-axis direction).

Specifically, the lens unit 1220 may include a lens group 1221 and a moving assembly 1222.

First, the lens group 1221 may include at least one lens. In addition, although a plurality of lens groups 1221 may be provided, the following description will be made based on one lens group.

The lens group 1221 may be coupled to the moving assembly 1222 and moved by an electromagnetic force generated from a fourth magnet 1252*a* and a fifth magnet 1252*b* coupled to the moving assembly 1222 in the third direction (Z-axis direction).

In the embodiment, the lens group 1221 may include a first lens group 1221*a*, a second lens group 1221*b*, and a third lens group 1221*c*. The first lens group 1221*a*, the second lens group 1221*b*, and the third lens group 1221*c* may be sequentially disposed in the optical axis direction. Furthermore, the lens group 1221 may further include a fourth lens group 1221*d*. The fourth lens group 1221*d* may be disposed at a rear end of the third lens group 1221*c*.

The first lens group 1221*a* may be fixedly coupled to a 2-1 housing. In other words, the first lens group 1221*a* may not move in the optical axis direction.

The second lens group 1221*b* may be coupled to a first lens assembly 1222*a* to move in the third direction or the optical axis direction. Magnification adjustment may be performed by moving the first lens assembly 1222*a* and the second lens group 1221*b*.

The third lens group 1221*c* may be coupled to the second lens assembly 1222*b* to move in the third direction or the optical axis direction. Focus adjustment or auto focusing may be performed by moving the third lens group 1221.

However, the present invention is not limited to the number of lens groups, and the fourth lens group 1221*d* may not be present, or additional lens groups or the like other than the fourth lens group 1121*d* may be further disposed.

The moving assembly 1222 may include an opening area surrounding the lens group 1221. The moving assembly 1222 is used interchangeably with the lens assembly. In addition, the moving assembly 1222 may be coupled to the lens group 1221 by various methods. In addition, the moving assembly 1222 may include a groove in a side surface thereof and may be coupled to the fourth magnet 1252*a* and the fifth magnet 1252*b* through the groove. A coupling member or the like may be applied to the groove.

In addition, the moving assembly 1222 may be coupled to the elastic units (not illustrated) at an upper end and a rear end thereof. Therefore, the moving assembly 1222 may be supported by the elastic units (not illustrated) while moving in the third direction (Z-axis direction). In other words, the position of the moving assembly 1222 may be maintained in the third direction (Z-axis direction). The elastic unit (not illustrated) may be formed of various elastic elements such as a leaf spring.

The moving assembly 1222 may be positioned in the second housing 1230 and may include the first lens assembly 1222*a* and a second lens assembly 1222*b*.

An area of the second lens assembly 1222*b* in which the third lens group is seated may be positioned at a rear end of the first lens assembly 1222*a*. In other words, the area of the second lens assembly 1222*b* in which the third lens group 1221*c* is seated may be positioned between an area of the first lens assembly 1222*a* in which the second lens group 1221*b* is seated and the image sensor.

The first lens assembly 1222*a* and the second lens assembly 1222*b* may face a first guide unit G1 and a second guide unit G2, respectively. The first guide unit G1 and the second guide unit G2 may be positioned on a first side portion and a second side portion of the second housing 1230 to be described below. A detailed description thereof will be made below.

In addition, a second driving magnet may be seated on outer surfaces of the first lens assembly 1222*a* and the second lens assembly 1222*b*. For example, the fifth magnet 1252*b* may be seated on the outer surface of the second lens assembly 1222*b*. The fourth magnet 1252*a* may be seated on the outer surface of the first lens assembly 1222*a*.

The second housing 1230 may be disposed between the lens unit 1220 and the second shield can (not illustrated). In addition, the second housing 1230 may be disposed to surround the lens unit 1220.

The second housing 1230 may include a 2-1 housing 1231 and a 2-2 housing 1232. The 2-1 housing 1231 may be coupled to the first lens group 1221*a* and may also be coupled to the above-described first camera actuator. The 2-1 housing 1231 may be positioned in front of the 2-2 housing 1232.

In addition, the 2-2 housing 1232 may be positioned at a rear end of the 2-1 housing 1231. The lens unit 1220 may be seated inside the 2-2 housing 1232.

A hole may be formed in a side portion of the second housing 1230 (or the 2-2 housing 1232). A fourth coil 1251*a* and a fifth coil 1251*b* may be disposed in the hole. The hole may be positioned to correspond to the above-described groove of the moving assembly 1222.

In the embodiment, the second housing 1230 (in particular, the 2-2 housing 1232) may include a first side portion 1232*a* and a second side portion 1232*b*. The first side portion 1232*a* and the second side portion 1232*b* may be positioned to correspond to each other. For example, the first side portion 1232*a* and the second side portion 1232*b* may be symmetrically disposed with respect to the third direction. A second driving coil 1251 may be positioned on the first side portion 1232*a* and the second side portion 1232*b*. In addition, the second substrate unit 1270 may be seated on outer surfaces of the first side portion 1232*a* and the second side portion 1232*b*. In other words, a first substrate 1271 may be positioned on the outer surface of the first side portion 1232*a*, and a second substrate 1272 may be positioned on the outer surface of the second side portion 1232*b*.

Furthermore, the first guide unit G1 and the second guide unit G2 may be positioned on the first side portion 1232*a* and the second side portion 1232*b* of the second housing 1230 (in particular, the 2-2 housing 1232).

The first guide unit G1 and the second guide unit G2 may be positioned to correspond to each other. For example, the first guide unit G1 and the second guide unit G2 may be positioned to face each other with respect to the third direction (Z-axis direction). In addition, at least portions of the first guide unit G1 and the second guide unit G2 may overlap each other in the second direction (Y-axis direction).

The first guide unit G1 and the second guide unit G2 may include at least one groove (e.g., a guide groove) or recess. In addition, a first ball B1 or a second ball B2 may be seated in the groove or the recess. Therefore, the first ball B1 or the second ball B2 may move in the guide groove of the first guide unit G1 or the guide groove of the second guide unit G2 in the third direction (Z-axis direction).

Alternatively, the first ball B1 or the second ball B2 may move in the third direction along a rail formed at an inner side of the first side portion 1232*a* of the second housing 1230 or a rail formed at an inner side of the second side portion 1232*b* of the second housing 1230.

Therefore, the first lens assembly 1222*a* and the second lens assembly 1222*b* may move in the third direction.

According to the embodiment, the first ball B1 may be disposed on an upper portion of the first lens assembly 1222a or the second lens assembly 1222b. In addition, the second ball B2 may be disposed on a lower portion of the first lens assembly 1222a or the second lens assembly 1222b. For example, the first ball B1 may be positioned above the second ball B2. Therefore, at least a portion of the first ball B1 may overlap the second ball B2 in the first direction (X-axis direction) depending on a position.

In addition, the first guide unit G1 and the second guide unit G2 may include first guide grooves GG1a and GG2a facing a first recess RS1. In addition, the first guide unit G1 and the second guide unit G2 may include second guide grooves GG1b and GG2b facing a second recess RS2. The first guide grooves GG1a and GG2a and the second guide grooves GG1b and GG2b may be grooves extending in the third direction (Z-axis direction). In addition, the first guide grooves GG1a and GG2a and the second guide grooves GG1b and GG2b may be grooves with different shapes. For example, the first guide grooves GG1a and GG2a may be grooves with inclined side surfaces, and the second guide grooves GG1b and GG2b may be grooves with side surfaces perpendicular to lower surfaces.

The fifth magnet 1252b may be positioned to face the fifth coil 1251b. In addition, the fourth magnet 1252a may be positioned to face the fourth coil 1251a.

The elastic unit (not illustrated) may include a first elastic member (not illustrated) and a second elastic member (not illustrated). The first elastic member (not illustrated) may be coupled to an upper surface of the moving assembly 1222. The second elastic member (not illustrated) may be coupled to a lower surface of the moving assembly 1222. In addition, the first elastic member (not illustrated) and the second elastic member (not illustrated) may be formed of a leaf spring as described above. In addition, the first elastic member (not illustrated) and the second elastic member (not illustrated) may provide elasticity for moving the moving assembly 1222. However, the present invention is not limited to the above-described position, and the elastic unit may be disposed at various positions.

In addition, the second driving unit 1250 may provide a driving force for moving the lens unit 1220 in the third direction (Z-axis direction). The second driving unit 1250 may include the second driving coil 1251 and the second driving magnet 1252. Furthermore, the second driving unit 1250 may further include a second Hall sensor unit. The second Hall sensor unit 1253 may include at least one fourth Hall sensor 1253a and may be positioned inside or outside the second driving coil 1251.

The moving assembly may be moved in the third direction (Z-axis direction) by the electromagnetic force generated between the second driving coil 1251 and the second driving magnet 1252.

The second driving coil 1251 may include the fourth coil 1251a and the fifth coil 1251b. The fourth coil 1251a and the fifth coil 1251b may be disposed in the holes formed in the side portions of the second housing 1230. In addition, the fourth coil 1251a and the fifth coil 1251b may be electrically connected to the second substrate unit 1270. Therefore, the fourth coil 1251a and the fifth coil 1251b may receive a current or the like through the second substrate unit 1270.

In addition, the second driving coil 1251 may be coupled to the second substrate unit 1270 through a yoke or the like. Furthermore, in the embodiment, the second driving coil 1251 is a fixed element together with the second substrate unit 1270. In contrast, the second driving magnet 1252 is a moving element that moves in the optical axis direction (Z-axis direction) together with the first and second assemblies.

The second driving magnet 1252 may include the fourth magnet 1252a and the fifth magnet 1252b. The fourth magnet 1252a and the fifth magnet 1252b may be disposed in the above-described groove of the moving assembly 1222 and positioned to correspond to the fourth coil 1251a and the fifth coil 1251b. In addition, the second driving magnet 1252 may be coupled to the first and second lens assemblies (or the moving assembly) together with the yoke to be described below.

The base unit 1260 may be positioned between the lens unit 1220 and the image sensor IS. A component such as a filter may be fixed to the base unit 1260. In addition, the base unit 1260 may be disposed to surround the above-described image sensor. With this configuration, since the image sensor is free from foreign substances and the like, it is possible to improve the reliability of the device. However, the description of the following some drawings will be made without the base unit 1260.

In addition, the second camera actuator 1200 may be a zoom actuator or an AF actuator. For example, the second camera actuator 1200 may support one lens or a plurality of lenses and perform an AF function or a zooming function by moving the lenses according to a predetermined control signal of a control unit.

In addition, the second camera actuator may be a fixed zoom or continuous zoom. For example, the second camera actuator may provide movement of the lens group 1221.

In addition, the second camera actuator may be formed of a plurality of lens assemblies. For example, at least one of a third lens assembly (not illustrated), in addition to the first lens assembly 1222a and the second lens assembly 1222b, and a guide pin (not illustrated) may be disposed in the second camera actuator. The above-described contents may be applied thereto. Therefore, the second camera actuator may perform a high-magnification zooming function through the second driving unit. For example, the first lens assembly 1222a and the second lens assembly 1222b may be moving lenses that move through the second driving unit and the guide pin (not illustrated), and the third lens assembly (not illustrated) may be a fixed lens, but the present invention is not limited thereto. For example, the third lens assembly (not illustrated) may perform a function of a focator by which light forms an image at a specific position, and the first lens assembly may perform a function of a variator for re-forming an image formed by the third lens assembly (not illustrated), which is the focator, at another position. Meanwhile, the first lens assembly may be in a state in which a magnification change is large because a distance to a subject or an image distance is greatly changed, and the first lens assembly, which is the variator, may play an important role in a focal length or magnification change of the optical system. Meanwhile, imaging points of an image formed by the first lens assembly, which is the variator, may be slightly different depending on a position. Therefore, the second lens assembly may perform a position compensation function for the image formed by the variator. For example, the second lens assembly may perform a function of a compensator for accurately forming an image at an actual position of the image sensor using the imaging points of the image formed by the second lens assembly 1222b which is the variator. However, the configuration of the embodiment will be described with reference to the following drawings.

The image sensor may be positioned at an inner side or an outer side of the second camera actuator. In an embodiment, as illustrated, the image sensor may be positioned at the outer side of the second camera actuator. For example, the image sensor may be positioned on a circuit substrate. The image sensor may receive light and convert the received light into an electrical signal. In addition, the image sensor may include a plurality of pixels in the form of an array. In addition, the image sensor may be positioned on the optical axis.

The second substrate unit 1270 may be in contact with the second housing side portion. For example, the second substrate unit 1270 may be positioned on the outer surface (first side surface) of the first side portion and the outer surface (second side surface) of the second side portion of the second housing, in particular, the 2-2 housing and may be in contact with the first side surface and the second side surface.

In addition, in the camera apparatus according to the embodiment, the second driving unit may provide driving forces F3A, F3B, F4A, and F4B that move the first lens assembly 1222*a* and the second lens assembly 1222*b* of the lens unit 1220 in the third direction (Z-axis direction). As described above, the second driving unit may include the second driving coil 1251 and the second driving magnet 1252. In addition, the lens unit 1220 may be moved by the electromagnetic force generated between the second driving coil 1251 and the second driving magnet 1252 in the third direction (Z-axis direction).

At this time, the fourth coil 1251*a* and the fifth coil 1251*b* may be disposed in the holes formed in the side portions (e.g., the first side portion and the second side portion) of the second housing 1230. In addition, the fifth coil 1251*b* may be electrically connected to the first substrate 1271. The fourth coil 1251*a* may be electrically connected to the second substrate 1272. Therefore, the fourth coil 1251*a* and the fifth coil 1251*b* may receive a driving signal (e.g., a current) from a driving driver on the circuit substrate 1300 through the second substrate unit 1270.

At this time, the first lens assembly 1222*a* on which the fourth magnet 1252*a* is seated may be moved in the third direction (Z-axis direction) by the electromagnetic forces F3A and F3B between the fourth coil 1251*a* and the fourth magnet 1252*a*. In addition, the second lens group 1221*b* seated on the first lens assembly 1222*a* may also move in the third direction.

In addition, the second lens assembly 1222*b* on which the fifth magnet 1252*b* is seated may be moved in the third direction (Z-axis direction) by the electromagnetic forces F4A and F4B between the fifth coil 1251*b* and the fifth magnet 1252*b*. In addition, the third lens group 1221*c* seated on the second lens assembly 1222*b* may also move in the third direction.

Therefore, as described above, a focal length or magnification of the optical system may be changed by moving the second lens group 1221*b* and the third lens group 1221*c*. In the embodiment, the magnification may be changed by moving the second lens group 1221*b*. In other words, zooming may be performed. In addition, a focus may be adjusted by moving the third lens group 1221*c*. In other words, auto focusing may be performed. With this configuration, the second camera actuator may be a fixed zoom or a continuous zoom.

Figure 11:
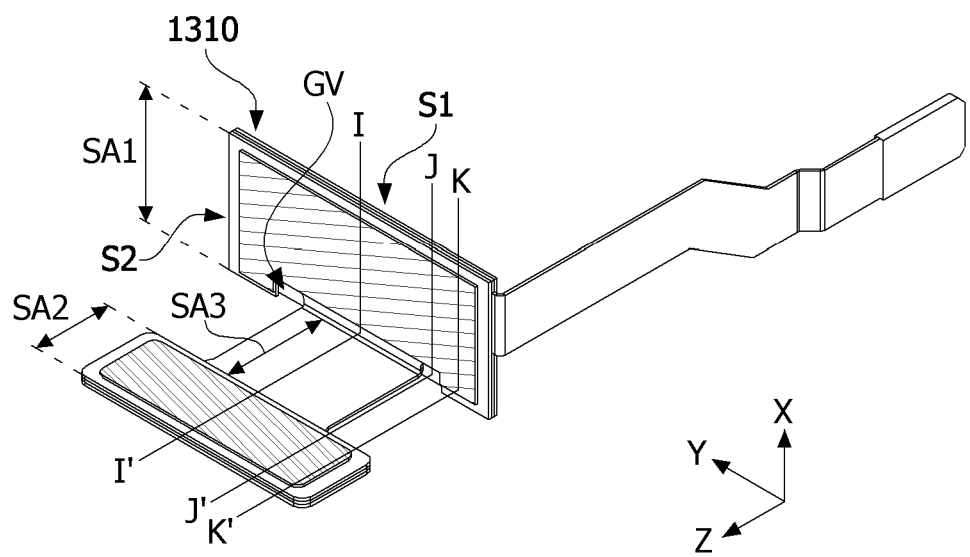
FIG. 11 is a perspective view illustrating a circuit substrate according to the embodiment.
Figure 12:
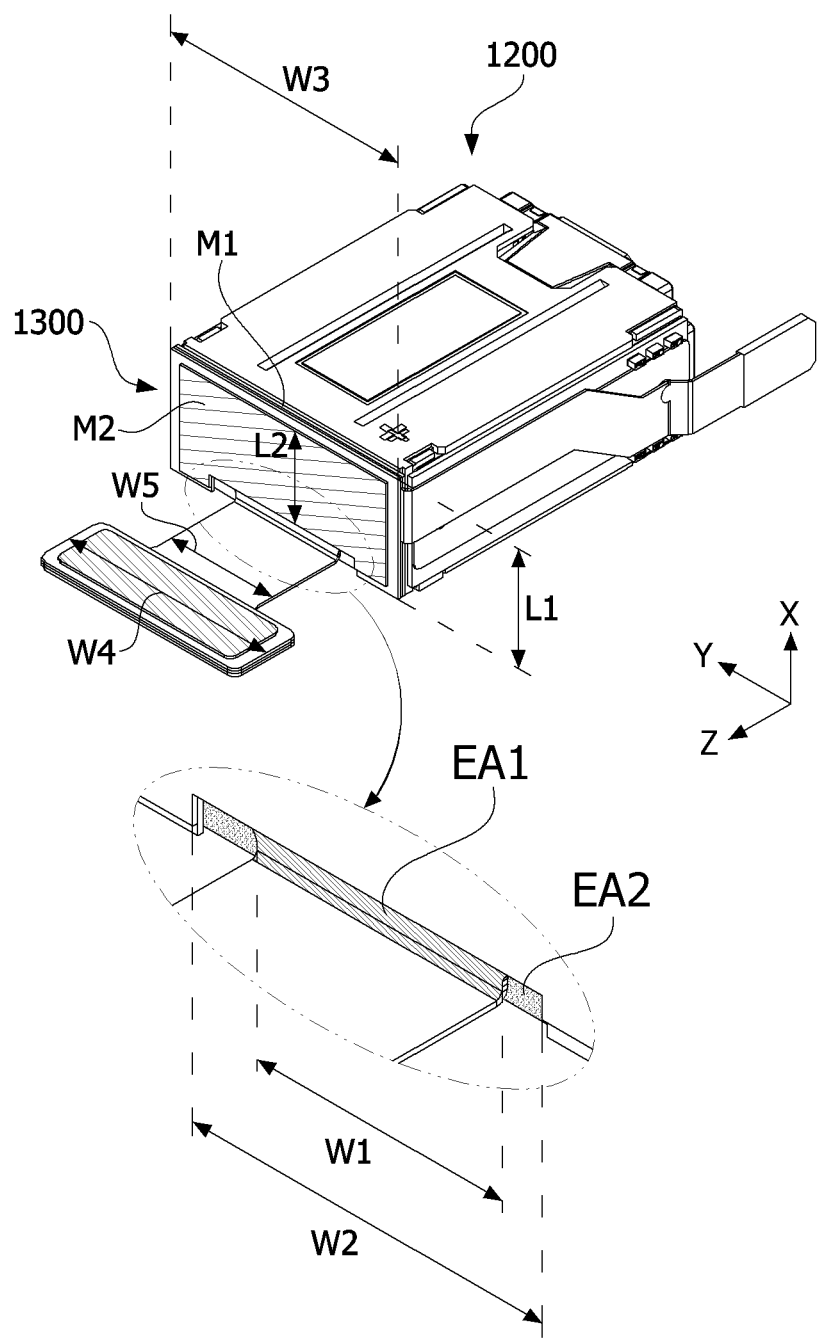
FIG. 12 is a perspective view of the circuit substrate and the second camera actuator according to the embodiment.
Figure 13:
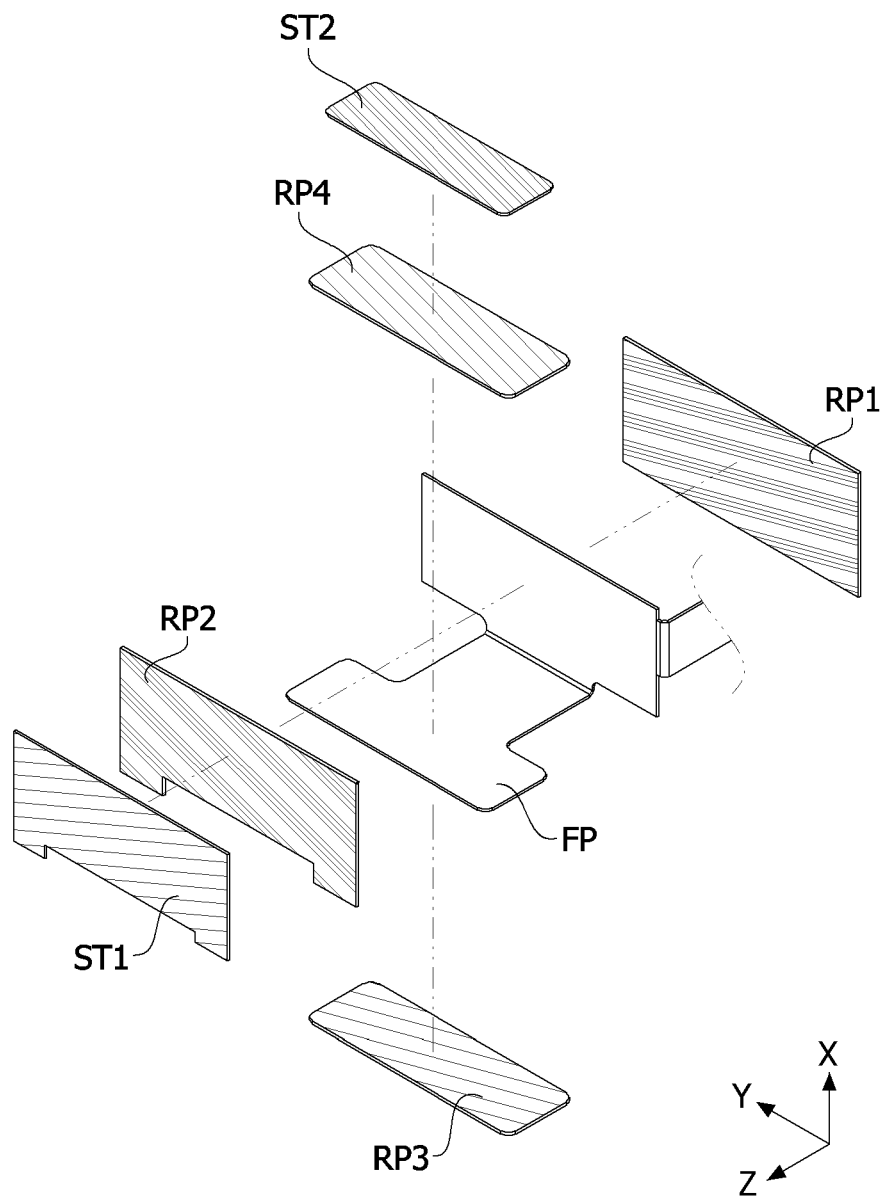
FIG. 13 is an exploded perspective view of the circuit substrate according to an embodiment.
Figure 14:
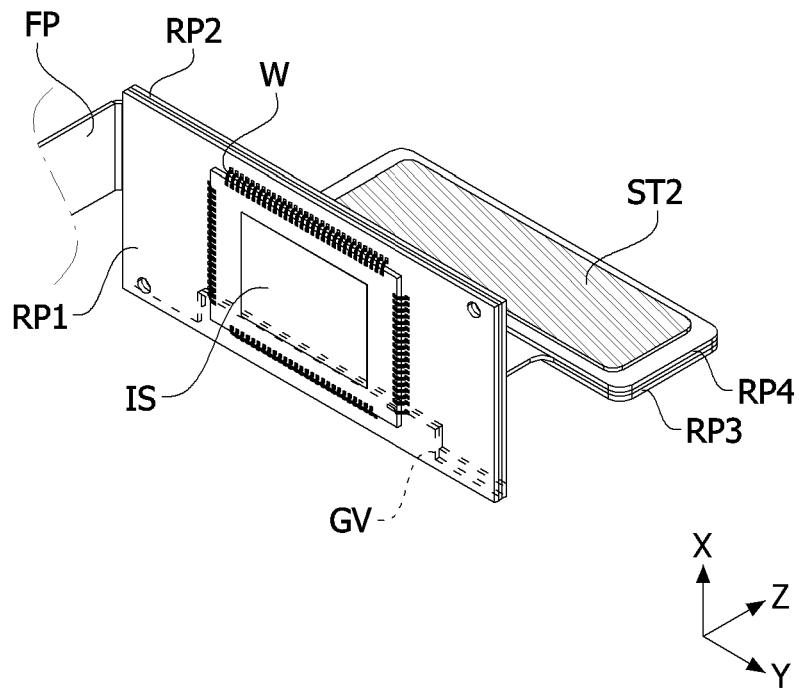
FIG. 14 is a perspective view of the circuit substrate and an image sensor according to the embodiment.
Figure 15:
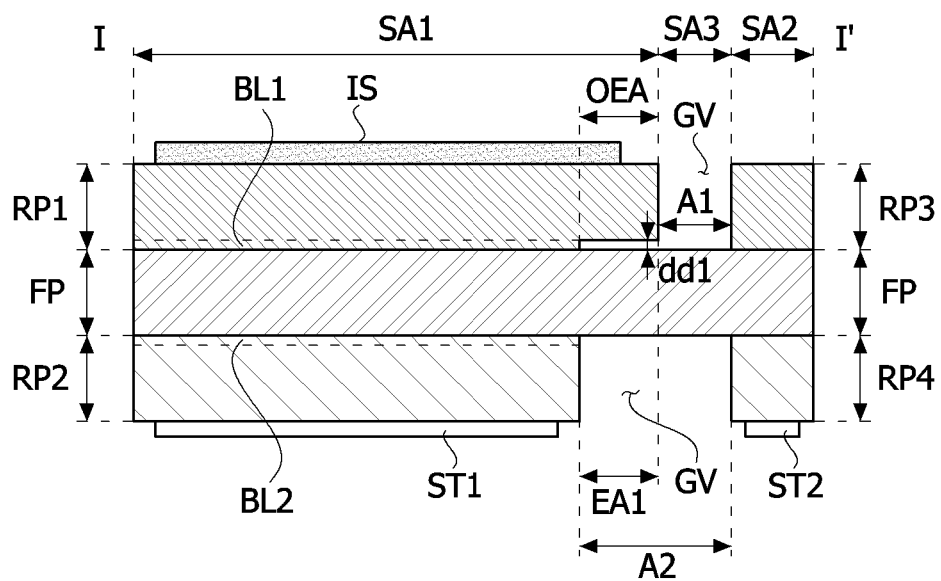
FIG. 15 is a view along line I-I' in FIG. 11.
Figure 16:
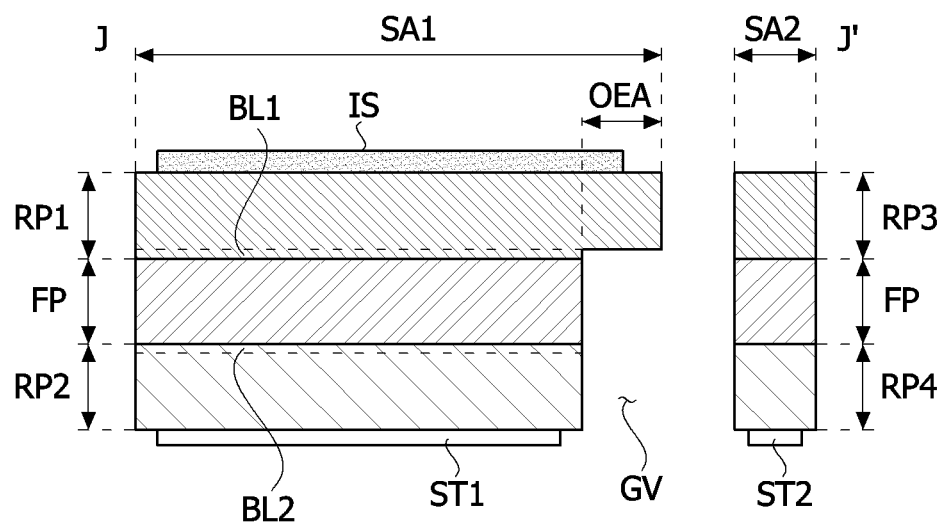
FIG. 16 is a view along line J-J' in FIG. 11.
Figure 17:
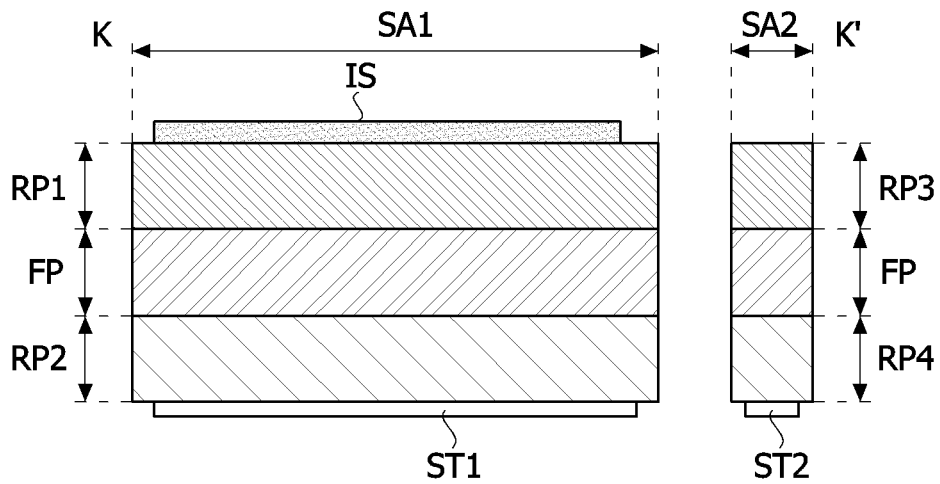
FIG. 17 is a view along line K-K' in FIG. 11.

FIG. 11 is a perspective view illustrating a circuit substrate according to the embodiment, FIG. 12 is a perspective view of the circuit substrate and the second camera actuator according to the embodiment, FIG. 13 is an exploded perspective view of the circuit substrate according to an embodiment, FIG. 14 is a perspective view of the circuit substrate and an image sensor according to the embodiment, FIG. 15 is a view along line I-I' in FIG. 11, FIG. 16 is a view along line J-J' in FIG. 11, and FIG. 17 is a view along line K-K' in FIG. 11.

Referring to FIGS. 11 to 14, the circuit substrate 1300 according to the embodiment may be disposed outside the second camera actuator 1200. In addition the circuit substrate 1300 according to the embodiment is referred to as "main substrate" and will be described with this term below.

In addition, the main substrate 1300 may be disposed at the rear end of the second camera actuator 1200 in the optical axis direction. Therefore, the first camera actuator, the second camera actuator 1200, and the main substrate 1300 may be sequentially disposed in the optical axis direction.

The main substrate 1300 according to the embodiment may include a central substrate unit 1310 and a side substrate unit 1320. The central substrate unit 1310 may overlap the second camera actuator in the optical axis direction (Z-axis direction). In addition, the image sensor IS may be disposed on the central substrate unit 1310. In addition, the central substrate unit 1310 and the image sensor IS may be electrically connected. A detailed description thereof will be made below.

In addition, the side substrate unit 1320 may be positioned on the side portions of the first and second camera actuators. In particular, the side substrate unit 1320 may be connected to the central substrate unit 1310 and may extend from the central substrate unit 1310 to a side surface of the second camera actuator 1200 or a side surface of the first camera actuator. In the drawings, the side substrate unit 1320 may extend to the first camera actuator. Furthermore, the side substrate unit 1320 may be provided as a plurality of side substrate units. For example, the plurality of side substrate units may be positioned to correspond (e.g., face each other) with respect to the second camera actuator or the optical axis. In addition, the side substrate unit 1320 may be in contact with the first side portion or the second side portion of the second camera actuator. For example, the second substrate unit according to the embodiment may be disposed on the side surface of the second camera actuator. For example, the second substrate unit may be in contact with the side surface of the second camera actuator. In addition, the first substrate unit according to the embodiment may be disposed on the side surface of the first camera actuator. For example, the first substrate unit may be in contact with the side surface of the first camera actuator.

In addition, the main substrate 1300 may be electrically connected to the first camera actuator or the second camera actuator 1200 through the side substrate unit 1320.

In addition, the main substrate 1300 may include a circuit substrate with line patterns that may be electrically connected, such as a rigid PCB, a flexible PCB, or a rigid flexible PCB. However, the present invention is not limited to these types. A detailed description thereof will be made below.

The main substrate 1310 may further include a connector CN electrically connected to an external electronic device. The camera apparatus or the circuit substrate may be electrically connected to the external electronic device through the connector CN. For example, the connector CN may be electrically connected to a processor of an electronic device such as a terminal. In addition, the main substrate 1300 may be electrically connected to another camera module in the terminal or a processor of the terminal. Therefore, the above-described camera actuator and camera apparatus including the same may transmit and receive various signals in the terminal.

Furthermore, the central substrate unit 1310 of the main substrate 1300 may be bent in the optical axis direction. In addition, the central substrate unit 1310 may extend in the optical axis direction. The following description will be made based on the central substrate unit 1310 except for the side substrate unit 1320. Therefore, the central substrate unit 1310 will be described by being used interchangeably with "main substrate."

In addition, the main substrate 1310 may include a first main substrate SA1 on which the image sensor is mounted, a second main substrate SA2 disposed to be spaced apart from the first main substrate, and a connection substrate SA3 disposed between the first main substrate SA1 and the second main substrate SA2. Therefore, the connection substrate SA3 may be connected to the first main substrate SA1 and the second main substrate SA2. In the embodiment, the image sensor IS may be positioned between the camera actuator (particularly, the second camera actuator) and the main substrate 1300 as described above. In addition, at least a portion of the image sensor IS may overlap the second camera actuator and the main substrate 1300 in the optical axis direction (Z-axis direction).

Since the image sensor IS is mounted on the first main substrate SA1, the first main substrate SA1 may overlap the image sensor IS in the optical axis direction. Furthermore, an area of the first main substrate SA1 may be greater than an area of the image sensor IS. Here, the area may be an area of a plane (XY).

In the embodiment, the first main substrate SA1 may include a first surface S1 and a second surface S2 facing each other. The image sensor IS may be mounted on the first surface S1. The second surface S2 may be an outer surface as a surface facing the second main substrate SA2 or the connection substrate SA3. In addition, the first surface S1 and the second surface S2 may be surfaces that face each other. Furthermore, at least portions of the first surface S1 and the second surface S2 may overlap in the optical axis direction (Z-axis direction).

In addition, first and third rigid substrates RP1 and RP3 to be described below may include the first surface S1. In addition, second and fourth rigid substrates RP2 and RP4 may include the second surface S2.

In addition, the first main substrate SA1 and the second main substrate SA2 may be disposed to be spaced apart from each other in the optical axis direction (Z-axis direction). In addition, in the central substrate unit 1310, a flexible (or a flexible) circuit substrate and a rigid circuit substrate may be positioned on the first main substrate SA1 and the second main substrate SA2. In this case, a stacking direction of the flexible circuit substrate and the rigid circuit substrate on the first main substrate SA1 may be different from a stacking direction of the flexible circuit substrate and the rigid circuit substrate on the second main substrate SA2. For example, the stacking direction of the flexible circuit substrate and the rigid circuit substrate on the first main substrate SA1 may be perpendicular to the stacking direction of the flexible circuit substrate and the rigid circuit substrate on the second main substrate SA2. In addition, the stacking direction of the flexible circuit substrate and the rigid circuit substrate on the first main substrate SA1 may correspond to the optical axis direction. In addition, the stacking direction of the flexible circuit substrate and the rigid circuit substrate on the second main substrate SA2 may correspond to the first direction.

Furthermore, the first main substrate SA1 may include a groove GV disposed in a surface M2 opposite to a surface M1 facing the second camera actuator. In other words, the groove GV may be positioned in the second rigid substrate to be described below.

According to the embodiment, the main substrates 1300 and 1310 may include the flexible circuit substrate and the rigid circuit substrate. In the specification, the flexible circuit substrates of the main substrates 1300 and 1310 will be described as "flexible substrate," and the rigid circuit substrate of the main substrate 1310 will be described as "rigid substrate" (e.g., first rigid substrate).

First, a flexible substrate FP may be disposed on each of the first main substrate SA1, the second main substrate SA2, and the connection substrate SA3. In other words, in the main substrate 1310, the flexible substrate FP may be a common element in each area. In the embodiment, the flexible substrates FP may be formed integrally or separately. For example, it is possible to improve the ease of manufacture and assembly with the integrated flexible substrate FP.

In addition, the flexible substrate FP may be disposed between the first rigid substrate RP1 and the second rigid substrate RP2. In addition, the flexible substrate FP may be disposed between the third rigid substrate RP3 and the fourth rigid substrate RP4.

In addition, the flexible substrate FP may be bent from the first main substrate SA1 to the connection substrate SA3 (or the second main substrate).

In addition, the main substrate 1310 may include the first rigid substrate RP1 disposed on the surface (first surface S1) of the first main substrate SA1 facing the second camera actuator and the second rigid substrate RP2 corresponding to the first rigid substrate RP1 with respect to the flexible substrate FP. In other words, the first rigid substrate RP1 may be positioned inside the flexible substrate FP, and the second rigid substrate RP2 may be positioned outside the flexible substrate FP.

In addition, the main substrate 1310 may include the third rigid substrate RP3 positioned inside or under the flexible substrate FP of the second main substrate SA2 and the fourth rigid substrate RP4 corresponding to the third rigid substrate RP3 with respect to the flexible substrate FP. In other words, the third rigid substrate RP3 may be positioned under the flexible substrate FP, and the fourth rigid substrate RP4 may be positioned above the flexible substrate FP. In addition, the third rigid substrate RP3, the flexible substrate FP, and the fourth rigid substrate RP4 may be sequentially stacked on the second main substrate SA2 in the first direction. In addition, the main substrate 1310 may include a first rigid substrate unit RP1 and RP3, a second rigid substrate unit RP2 and RP4, and the flexible substrate FP disposed between the first rigid substrate unit and the second rigid substrate unit. The first rigid substrate unit may include the first rigid substrate RP1 and the third rigid substrate RP3. The second rigid substrate unit may include the second rigid substrate RP2 and the fourth rigid substrate RP4.

In the embodiment, the groove GV may be formed in one side surface of the first main substrate SA1. For example, the groove may be formed in a lower surface of the first main substrate SA1. The connection substrate SA3 may be positioned inside or at the groove GV. In addition, the first main substrate SA1 may include an overlapping area OEA in which the first surface S1 and the groove partially overlap each other in a direction from the second surface S2 to the first surface S1. In other words, the overlapping area OEA may be an area in which a second groove A2 overlaps the first surface S1 in the optical axis direction (Z-axis direction). Therefore, the first rigid substrate unit or the first rigid substrate may include the overlapping area OEA. In this case, the overlapping area OEA may include a first area to be described below. Therefore, the connection substrate SA3 may be spaced apart from the first area (or the overlapping area OEA) inside the groove GV.

In other words, unlike the second rigid substrate unit or the second rigid substrate RP2, the first rigid substrate unit or the first rigid substrate RP1 may include the overlapping area OEA or the first area that is a protruding portion protruding toward the groove GV. In other words, the overlapping area OEA may correspond to the protruding portion or the first area.

In the embodiment, in the overlapping area OEA, the first surface may not overlap the second surface S2 in a direction from the second surface S2 to the first surface S1. In other words, in the overlapping area OEA, the first surface S1 and the second surface S2 may not overlap each other.

In addition, one side surface of the overlapping area OEA may be disposed on the same line or the same surface as the first surface S1, which is one side surface of the first main substrate. Alternatively, the one side surface of the overlapping area OEA may form the same surface as the first surface S1, which is the one side surface of the first main substrate. The direction from the second surface S2 to the first surface S1 may be parallel to the optical axis direction or the third direction. In addition, the direction from the second surface S2 to the first surface S1 may correspond to the optical axis direction or a direction opposite to the third direction.

In addition, in the first main substrate, a horizontal width W3 of the first surface S1 may be greater than vertical lengths L1 and L2.

In addition, the area of the first surface S1 of the first main substrate may be greater than the area of the second surface S2. This is due to the overlapping area OEA.

In addition, the flexible substrate FP may include a first exposed area EA1 exposed by the groove GV in the first main substrate SA1. Here, the first exposed area EA1 may be an area in which the flexible substrate FP is exposed. In an embodiment, the groove GV may be positioned in the first rigid substrate RP1 and the second rigid substrate RP2. In particular, the groove GV may be disposed along edges of the first rigid substrate RP1 and the second rigid substrate RP2.

In the embodiment, the width W3 of the second rigid substrate RP2 in the second direction (Y-axis direction) may be greater than the lengths L1 and L2 in the first direction (X-axis direction). Therefore, the groove GV may be disposed in a long side of the second rigid substrate RP2. With this configuration, the length of the main substrate 1310 in the first direction may not be changed depending on a width of the connection substrate SA3. Therefore, a length of the main substrate 1310 in the first direction may not increase. In addition, it is possible to minimize a length of the camera module or the camera apparatus according to the embodiment in the first direction. Furthermore, it is possible to minimize a thickness of an electronic device, such as a terminal, on which the camera module is mounted.

In addition, the maximum length L1 of the main substrate 1300 in the first direction (X-axis direction) may be greater than the length L2 in the first direction (X-axis direction) in the area in which the groove GV is formed.

In addition, the groove GV may correspond to the first rigid substrate RP1 based on the flexible substrate FP.

Furthermore, the first exposed area EA1 may overlap some areas of the first rigid substrate RP1 in the optical axis direction.

In addition, a surface of the first rigid substrate RP1 in contact with the flexible substrate FP may also be exposed through the groove GV. In the embodiment, the first rigid substrate RP1 may include a second exposed area EA2 exposed by the groove GV. The second exposed area EA2 is an area in which the first rigid substrate RP1 is exposed and is the same as the first exposed area EA1 with respect to the first main substrate SA1. The first exposed area EA1 and the second exposed area EA2 may be disposed to be misaligned in the optical axis direction. In other words, the first exposed area EA1 and the second exposed area EA2 may not overlap each other in the optical axis direction.

The connection substrate SA3 may be formed integrally with or connected to the flexible substrate FP on the first main substrate SA1.

In addition, in the first main substrate, the width W3 of the flexible substrate FP may be greater than a width W5 of the connection substrate SA3. The width is a length in the second direction.

In addition, an area of the first rigid substrate RP1 may be greater than an area of the second rigid substrate RP2 due to the groove GV. In addition, the groove GV may be positioned on an opposite surface of the image sensor IS based on the flexible substrate FP. In other words, the groove GV may be positioned on the second rigid substrate RP2 rather than the first rigid substrate RP1, which is electrically connected to the image sensor through a wire W or the like. With this configuration, the flexible substrate FP may be easily bent or curved while easily securing a space for connecting the image sensor IS to the first rigid substrate RP1 by the wire W or the like. In this case, a curved portion formed as the flexible substrate FP is bent is positioned inside the groove GV, and thus a length of the circuit substrate may not be increased in the first direction (X-axis direction). Furthermore, it is possible to minimize the length of the main substrate 1300 in the first direction. Therefore, it is also possible to minimize the thickness of the electronic device such as the terminal.

In addition, a width W1 of the flexible substrate FP in the first exposed area EA1 may be smaller than a width W2 of the groove GV. Therefore, it is possible to easily secure the space in which the flexible substrate FP is bent or curved. In addition, it is possible to secure the connection substrate SA3 to be connected to an external electronic device by one-time bending through the groove GV. Therefore, it is possible to simplify a process for bending the flexible substrate FP, thereby increasing the productivity of the main substrate. Furthermore, since the number of times of being bent or curved is reduced, it is possible to reduce a tolerance due to bending, thereby improving assemblability.

In addition, the width W3 of the first main substrate SA1 in the second direction (Y-axis direction) may be greater than a width W4 of the second main substrate SA2 in the second direction (Y-axis direction).

In addition, the width of the flexible substrate FP may decrease from the first exposed area EA1 toward the second main substrate SA2. For example, the width of the flexible substrate FP may increase toward the first direction (X-axis direction). Therefore, the flexible substrate FP may be easily made to be bent or curved.

Furthermore, the main substrate 1300 may be formed of a plurality of layers depending on the area. In addition, the main substrate 1300 may have a hole or a plurality of layers for a circuit pattern inside each area.

For example, the main substrate 1300, the first side substrate unit 1320, and the second side substrate unit 1330 may include a rigid PCB and a flexible PCB disposed in a plurality of layers. For example, the main substrate 1300 may have a structure in which the flexible PCB, the rigid PCB, and the flexible PCB are sequentially stacked. In addition, a reinforcer or a reinforcing plate may be additionally disposed in the area in which the flexible PCB is disposed on the main substrate 1300, the first side substrate unit 1320, and the second side substrate unit 1330. For example, the reinforcing plate may be additionally disposed on the upper portion or lower portion of the main substrate 1300.

In addition, in the specification, the first side substrate unit or the second side substrate unit may be formed of the flexible PCB. In addition, the rigid PCB may be disposed inside and/or outside the flexible PCB on the first side substrate unit or the second side substrate unit. In this case, a first side area and a second side area may correspond to areas in which the rigid PCB is disposed on the first side substrate unit or the second side substrate unit.

In addition, the second substrate unit 1270 may include a first substrate and a second substrate. The first substrate may face the side substrate unit and may be in partial contact with the side substrate unit. Alternatively, the second substrate may face the side substrate unit and may be in partial contact with the second side substrate unit.

Referring to FIGS. 15 to 17, the flexible substrate FP according to the embodiment may be commonly positioned on the first main substrate SA1, the second main substrate SA2, and the connection substrate SA3 as described above. In addition, the first rigid substrate RP1 may be positioned on one surface of the flexible substrate FP of the first main substrate SA1. In addition, the second rigid substrate RP2 may be positioned on the other surface of the flexible substrate FP of the first main substrate SA1.

Due to the groove GV, a length of the first rigid substrate RP1 in the first direction of the first main substrate SA1 may be greater than a length of the second rigid substrate RP2 in the first direction. For example, lengths of the groove GV and the second rigid substrate RP2 in the first direction of the first main substrate SA1 may correspond to the length of the first rigid substrate RP1 in the first direction.

In the embodiment, the flexible substrate FP may be a PCB made of a soft or flexible material. In addition, the flexible substrate FP may be formed of a plurality of layers. For example, the flexible substrate FP may be formed of a base layer and a coverlay layer. For example, the flexible substrate FP may have a structure in which the coverlay layer, the base layer, and the coverlay layer are sequentially stacked in the first direction (from the second main substrate or the connection substrate). The base layer may be formed of a metal layer, a film layer, and the like. For example, the film layer may be made of polyimide, and the metal layer may be made of copper (Cu). In addition, the base layer may have a structure in which the metal layer, the film layer, and the metal layer are sequentially stacked in the first direction. Furthermore, the coverlay layer may be formed of a bonding layer disposed on a surface in contact with the base layer and a film layer corresponding to the base layer with the bonding layer interposed therebetween.

The first rigid substrate RP1 and the second rigid substrate RP2 may also be formed of a plurality of layers. The first rigid substrate RP1 and the second rigid substrate RP2 may have the same or different thicknesses. Furthermore, the first rigid substrate RP1 and the second rigid substrate RP2 may be formed of different layers or the same layer.

For example, the first rigid substrate RP1 may include a first bonding layer BL1 in contact with the flexible substrate FP. The first bonding layer BL1 is one layer of the first rigid substrate RP1 and may be disposed closest to the flexible substrate FP.

In addition, the first bonding layer BL1 may be disposed to be misaligned with the groove GV in the optical axis direction. Alternatively, the first bonding layer BL1 may not overlap the groove GV in the optical axis direction.

The first bonding layer BL1 may be made of any of various bonding materials. In addition, the first bonding layer BL1 may be an insulating material, but is not limited thereto.

In addition, the first rigid substrate RP1 may further include a base layer, a plating layer, a bonding layer, a metal layer, a plating layer, a protective layer, and the like which are sequentially disposed on the first bonding layer BL1 in a direction opposite to the optical axis direction. The base layer may be formed of the film layer and the metal layer as described above. The metal layer may be made of copper foil.

In addition, the second rigid substrate RP2 may include a second bonding layer BL2 in contact with the flexible substrate FP. The second bonding layer BL2 is one layer of the second rigid substrate RP2. In addition, the second bonding layer BL2 may be disposed closest to the flexible substrate FP. In addition, the second bonding layer BL2 is made of any of various bonding materials. In addition, the second bonding layer BL2 may be made of an insulating material, but is not limited thereto.

In addition, a first fixing part ST1 may be further disposed on the second rigid substrate RP2. The first fixing part ST1 may be a reinforcing plate. Therefore, it is possible to increase the rigidity of the first main substrate SA1 of the main substrate.

Furthermore, the third rigid substrate RP3 may be positioned on one surface of the flexible substrate FP of the second main substrate SA2. The third rigid substrate RP3 may have a structure that is the same as or different from that of the first rigid substrate RP1.

In addition, the fourth rigid substrate RP4 may be positioned on the other surface of the flexible substrate FP of the second main substrate SA2. The fourth rigid substrate RP4 may have a structure that is the same as or different from that of the second rigid substrate RP2. Therefore, thicknesses (or structures) of two or more of the first rigid substrate RP1, the second rigid substrate RP2, the third rigid substrate RP3, and the fourth rigid substrate RP4 may be different or the same.

In addition, a second fixing part ST2 may be further disposed on the fourth rigid substrate RP4. The second fixing part ST2 may be a reinforcing plate. Therefore, it is possible to increase the rigidity of the first main substrate SA1 of the main substrate.

In addition, in the embodiment, the flexible substrate FP may be disposed inside the groove GV to be spaced apart from the first rigid substrate RP1 in the optical axis direction (Z-axis direction). In other words, the flexible substrate FP may be spaced a predetermined distance dd1 from the first rigid substrate RP1 in the optical axis direction inside the groove GV. In addition, the first bonding layer BL1 may be disposed only in some areas of the flexible substrate FP of the first main substrate SA1. With this configuration, the bending of the flexible substrate FP may not be hindered by the first bonding layer BL1 in the groove GV. Therefore, it is possible to suppress the occurrence of assembly errors in the circuit substrate or main substrate according to the embodiment, thereby increasing the productivity of the main substrate.

In addition, in the main substrate, at least one of the flexible substrate FP, the first rigid substrate RP1, the second rigid substrate RP2, the third rigid substrate RP3, and the fourth rigid substrate RP4 may be formed of a plurality of layers, and each substrate area may have a hole or a groove for circuit patterns therein.

In addition, only the flexible substrate FP may be disposed on the connection substrate RA3. In other words, the first rigid substrate RP1 to the fourth rigid substrate RP4 may not be disposed on the connection substrate RA3.

In addition, the groove GV may include a first groove A1 of the first rigid substrate unit and a second groove A2 of the second rigid substrate unit. The first groove A1 may be positioned between the first rigid substrate RP1 and the third rigid substrate RP3. The second groove A2 may be positioned between the second rigid substrate RP2 and the fourth rigid substrate RP4. At least portions of the first groove A1 and the second groove A2 may overlap in the optical axis direction. Therefore, at least a portion of the first groove A1 may correspond to the second groove A2. In addition, the protrusion protrudes toward the first groove A1. In addition, the protrusion and the flexible substrate FP may be disposed to be spaced apart from or face each other in the optical axis direction. In addition, the flexible substrate FP may be exposed by the second groove A2 and may have a second flexible area as will be described below.

In addition, a depth (length in the third direction) of the first groove A1 may be smaller than or equal to a depth (length in the third direction) of the second groove A2.

In addition, the flexible substrate FP may include the first flexible area A1 and the second flexible area A2. The second flexible area A2 of the flexible substrate FP may be exposed at the second rigid substrate RP2 or the second rigid substrate unit. In other words, the second flexible area corresponds to the second groove A2, and thus is used interchangeably with "A2." In addition, the first flexible area A1 of the flexible substrate FP may be exposed at the first rigid substrate RP1 or the first rigid substrate unit. Therefore, the first flexible area corresponds to the first groove A1 and thus is used interchangeably with "A1."

The second flexible area A2 may overlap or be superposed on a portion of the first rigid substrate RP1 in a direction from the second rigid substrate RP2 to the first rigid substrate RP1 (direction opposite to the third direction).

The exposed first flexible area A1 or second flexible area A2 of the flexible substrate FP may form a gap with the first rigid substrate RP1. For example, the first flexible area A1 of the flexible substrate FP may be spaced apart from the first area OEA in the optical axis direction. In addition, a gap may be formed between portions of the second flexible area A2 and the second rigid substrate RP2. Therefore, the portion of the second flexible area A2 may be spaced apart from the second rigid substrate RP2 in the optical axis direction.

Furthermore, a width of the second flexible area A2 of the flexible substrate may be greater than a width of the first flexible area A1.

In addition, at least a portion of the first rigid substrate RP1 may be exposed by the first groove A1.

In addition, the flexible substrate FP may extend from a bottom surface of the second groove A2.

In addition, in the embodiment, at least a portion of the flexible substrate FP may be disposed to be spaced apart from the first rigid substrate RP1 in the optical axis direction. This may correspond to the content described in the above-described protrusion or overlapping area OEA.

Figure 18:
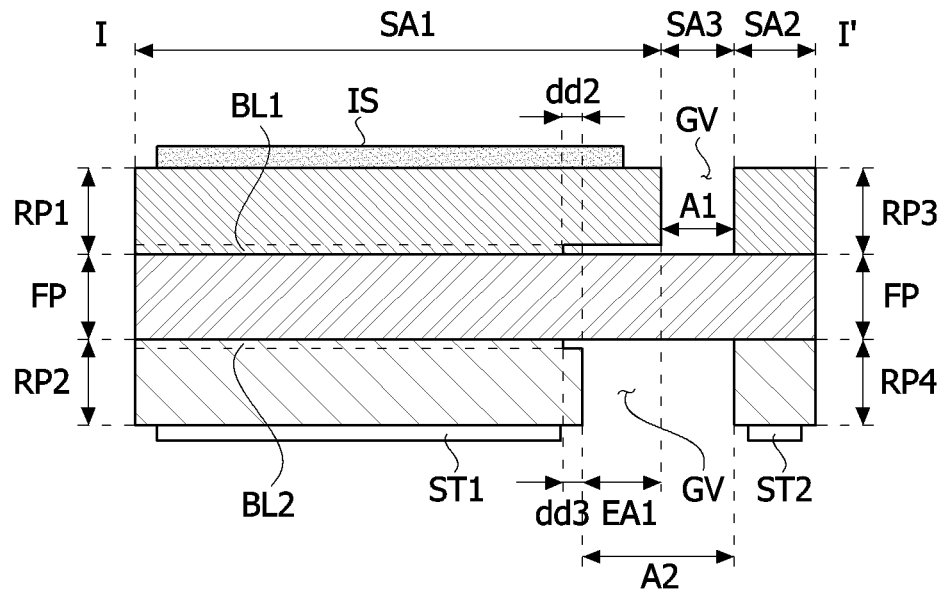
FIG. 18 is a cross-sectional view of a circuit substrate according to another embodiment.

FIG. 18 is a cross-sectional view of a circuit substrate according to another embodiment.

A circuit substrate or main substrate according to another embodiment may include the first main substrate SA1, the second main substrate SA2, and the connection substrate SA3 as described above. In addition, the main substrate may include the flexible substrate FP, the first rigid substrate RP1, the second rigid substrate RP2, the third rigid substrate RP3, and the fourth rigid substrate RP4. In other words, the above-described contents except for contents to be described below may be applied in the same manner.

In the main substrate according to another embodiment, the first bonding layer BL1 of the first rigid substrate RP1 may be spaced a predetermined distance dd2 from the groove GV or the first exposed area EA1. In other words, the area of the first rigid substrate RP1 may be greater than the sum of an area of the first exposed area and an area of the first bonding layer BL1. In addition, the length of the first rigid substrate RP1 in the second direction may be greater than the sum of a length of the first exposed area in the second direction and a length of the first bonding layer BL1 in the second direction.

The first main substrate SA1 may have the first bonding layer BL1. The first bonding layer BL1 may be in contact with the first rigid substrate RP1 and the flexible substrate FP. The layers may be bonded by the first bonding layer BL1.

In addition, the first bonding layer may not be disposed in a separation space between the flexible substrate FP and the first rigid substrate RP1 in the optical axis direction. In other words, the overlapping area OEA and the first bonding layer BL1 may not be in contact with each other and may not overlap in the optical axis direction. In addition, at least a portion of the first bonding layer BL1 may not overlap the first groove A1 in the optical axis direction (Z-axis direction). With this configuration, the bending of the flexible substrate FP may be easily made.

In addition, a sidewall of the groove GV and the first bonding layer BL1 may be misaligned in the optical axis direction. Furthermore, the sidewall of the groove GV and the first bonding layer BL1 may be misaligned in the first direction.

In addition, in the main substrate according to another embodiment, the second bonding layer BL2 of the second rigid substrate RP2 may be spaced a predetermined distance dd3 from the groove GV or the first exposed area EA1. In other words, the area of the second rigid substrate RP2 may be greater than the sum of the area of the first exposed area and an area of the second bonding layer BL2. In addition, the length of the second rigid substrate RP2 in the second direction may be greater than the sum of the length of the first exposed area in the second direction and a length of the second bonding layer BL2 in the second direction.

In addition, the sidewall of the groove GV and the second bonding layer BL2 may be misaligned in the optical axis direction. In addition, the sidewall of the groove GV and the second bonding layer BL2 may be misaligned in the first direction.

With this configuration, it is possible to suppress a phenomenon in which the first bonding layer BL1 spreads to the first exposed area EA1 due to a pressure such as pressing. Furthermore, it is also possible to suppress a phenomenon in which the second bonding layer BL2 spreads to the first exposed area EA1 due to a pressure such as pressing. Therefore, it is possible to solve the problem of the curvature increasing due to the bending of the flexible substrate FP by the first bonding layer BL1 or the second bonding layer BL2. Furthermore, since the bending of the flexible substrate FP may be easily made, it is possible to reduce the number of cracks or the like during mounting. In addition, it is possible to improve the reliability of the camera module.

Figure 19:
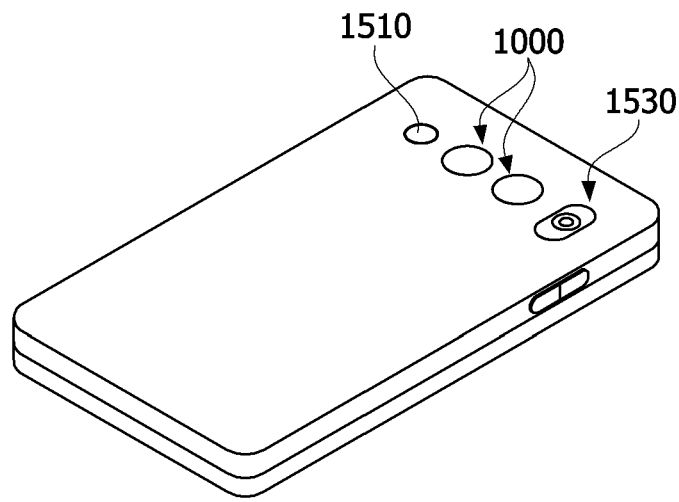
FIG. 19 is a perspective view of a mobile terminal to which the camera apparatus according to the embodiment is applied.

FIG. 19 is a perspective view of a mobile terminal to which the camera apparatus according to the embodiment is applied.

Referring to FIG. 19, a mobile terminal 1500 according to the embodiment may include the camera apparatus 1000, a flash module 1530, and an AF device 1510, which are provided on a rear surface thereof.

The camera apparatus 1000 may include an image capturing function and an AF function. For example, the camera apparatus 1000 may include the AF function using an image.

The camera apparatus 1000 processes a still image or image frames of moving images obtained by an image sensor in a capturing mode or a video call mode.

The processed image frame may be displayed on a predetermined display and stored in a memory. A camera (not illustrated) may also be disposed on a front surface of a body of the mobile terminal.

For example, the camera apparatus 1000 may include a first camera apparatus 1000A and a second camera apparatus 1000B, and the first camera apparatus 1000A may perform an OIS function together with an AF or zooming function. In addition, the second camera apparatus 1000B may perform the AF, zooming, and OIS functions. In this case, since the first camera apparatus 1000A includes both the above-described first camera actuator and second camera actuator, it is possible to easily miniaturize the camera apparatus by changing an optical path.

A light emitting device for emitting light may be included in the flash module 1530. The flash module 1530 may be operated by a camera operation of the mobile terminal or a user's control.

The AF device 1510 may include one package of a surface light emitting laser device as a light emitting unit.

The AF device 1510 may include the AF function using a laser. The AF device 1510 may be mainly used in a condition in which the AF function using the image of the camera apparatus 1000 is degraded, for example, in an environment that is close to 10 m or less or dark.

The AF device 1510 may include a light emitting unit including a vertical cavity surface emitting laser (VCSEL) semiconductor device and a light receiving unit for converting light energy into electrical energy, such as a photodiode.

Figure 20:
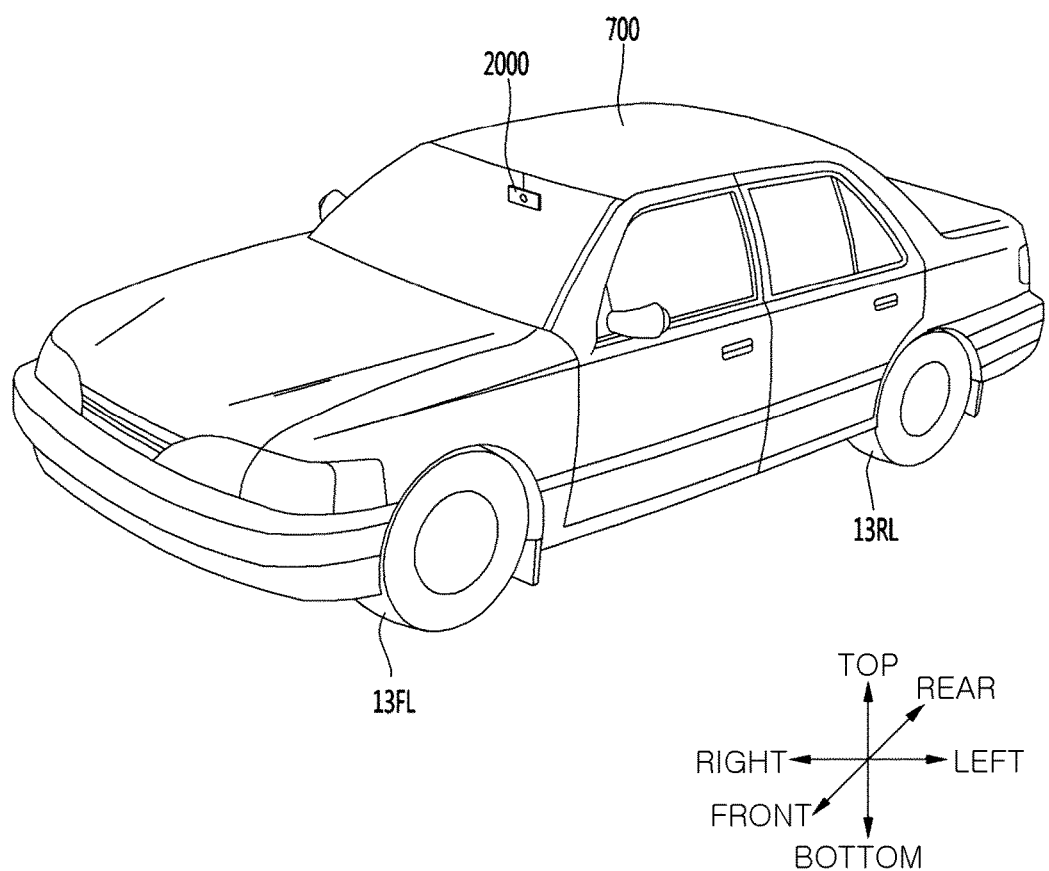
FIG. 20 is a perspective view of a vehicle to which the camera apparatus according to the embodiment is applied.

FIG. 20 is a perspective view of a vehicle to which the camera apparatus according to the embodiment is applied.

For example, FIG. 20 is a view of an exterior of a vehicle including a vehicle driver assistance device to which the camera apparatus 1000 according to the embodiment is applied.

Referring to FIG. 20, a vehicle 700 according to the embodiment may include a predetermined sensor and wheels 13FL and 13FR rotated by a power source. Although the sensor may be a camera sensor 2000, the present invention is not limited thereto.

The camera sensor 2000 may be a camera sensor to which the camera apparatus 1000 according to the embodiment is applied. The vehicle 700 according to the embodiment may acquire image information through the camera sensor 2000 for capturing a forward image or a nearby image, determine a situation in which a lane line is not identified using the image information, and generate a virtual lane line when the lane line is not identified.

For example, the camera sensor 2000 may acquire a forward image by capturing a view in front of the vehicle 700, and a processor (not illustrated) may acquire image information by analyzing an object included in the front image.

For example, when a lane line, an adjacent vehicle, a traveling obstacle, and objects, such as a median, a curb, or a tree corresponding to an indirect road mark, are photographed in the image captured by the camera sensor 2000, the processor may detect the object and include the detected object in the image information. In this case, the processor may further supplement the image information by acquiring information on a distance from the object detected through the camera sensor 2000.

The image information may be information on the object photographed in the image. The camera sensor 2000 may include an image sensor and an image processing module.

The camera sensor 2000 may process still images or moving images obtained by the image sensor (e.g., a complementary metal-oxide semiconductor (CMOS) or a charge-coupled device (CCD)).

The image processing module may process the still images or moving images acquired through the image sensor to extract necessary information, and transmit the extracted information to the processor.

In this case, the camera sensor 2000 may include a stereo camera in order to improve the measurement accuracy of the object and further secure information such as a distance between the vehicle 700 and the object, but the present invention is not limited thereto.

Although embodiments have been mainly described above, these are only illustrative and do not limit the present invention, and those skilled in the art to which the present invention pertains can know that various modifications and applications not exemplified above are possible without departing from the essential characteristics of the embodiments. For example, each component specifically illustrated in the embodiments may be implemented by modification. In addition, differences related to these modifications and applications should be construed as being included in the scope of the present invention defined in the appended claims.

The invention claimed is:

1. A camera apparatus comprising:
   a camera actuator;
   a main substrate; and
   an image sensor disposed between the camera actuator and the main substrate in an optical axis direction,
   wherein the main substrate includes a first main substrate including a first surface on which the image sensor is mounted and a second surface opposite to the first surface, and a connection substrate connected to the first main substrate,
   wherein a groove is formed in the second surface of the first main substrate,
   wherein a portion of the connection substrate is disposed in the groove, and
   wherein the first main substrate includes an overlapping area in which the first surface and a portion of the groove overlap each other in a direction from the second surface to the first surface.

2. The camera apparatus of claim 1, wherein the connection substrate is spaced apart from the overlapping area inside the groove.

3. The camera apparatus of claim 1, wherein the overlapping area of the first surface does not overlap the second surface in the direction from the second surface to the first surface.

4. The camera apparatus of claim 1, wherein one side surface of the overlapping area is disposed colinearly with the one side surface of the first main substrate.

5. The camera apparatus of claim 1, wherein a horizontal width of the first surface of the first main substrate is greater than a vertical width thereof.

6. The camera apparatus of claim 1, wherein an area of the first surface of the first main substrate is greater than an area of the second surface.

7. The camera apparatus of claim 1, wherein the connection substrate is formed integrally with a flexible substrate of the first main substrate.

8. The camera apparatus of claim 7, wherein a width of the flexible substrate of the first main substrate is greater than a width of the connection substrate.

9. A camera apparatus comprising:
a camera actuator;
a main substrate; and
an image sensor disposed between the camera actuator and the main substrate in an optical axis direction,
wherein the main substrate includes a first rigid substrate, a second rigid substrate, and a flexible substrate disposed between the first rigid substrate and the second rigid substrate,
wherein the flexible substrate includes a first flexible area and a second flexible area,
wherein the second flexible area of the flexible substrate is exposed at the second rigid substrate, and
wherein the second flexible area overlaps a portion of the first rigid substrate in a direction from the second rigid substrate to the first rigid substrate.

10. The camera apparatus of claim 9, wherein a gap is formed between the exposed first flexible area or second flexible area of the flexible substrate and the first rigid substrate.

11. The camera apparatus of claim 9,
wherein a width of the exposed second flexible area of the flexible substrate is greater than a width of the first flexible area.

12. A camera apparatus comprising,
a camera actuator;
a main substrate; and
an image sensor disposed between the camera actuator and the main substrate in an optical axis direction,
wherein the main substrate includes a first rigid substrate, a second rigid substrate, and a flexible substrate disposed between the first rigid substrate and the second rigid substrate,
wherein the image sensor is positioned on the first rigid substrate
wherein the first rigid substrate includes a first groove,
wherein the second rigid substrate includes a second groove of which at least a portion corresponds to the first groove,
wherein the first rigid substrate includes a protrusion protruding toward the first groove,
wherein the protrusion and the flexible substrate are disposed to be spaced apart from and face each other, and
wherein the flexible substrate is exposed through the second groove.

13. The camera apparatus of claim 12,
wherein the first rigid substrate includes a first surface, and the second rigid substrate includes a second surface facing the first surface.

14. The camera apparatus of claim 12,
wherein at least a portion of the first rigid substrate is exposed through the first groove.

15. The camera apparatus of claim 12,
wherein the flexible substrate extends from a bottom surface of the second groove.

16. The camera apparatus of claim 12,
wherein at least a portion of the flexible substrate is disposed to be spaced apart from the first rigid substrate in the optical axis direction.

17. The camera apparatus of claim 12,
wherein the main substrate includes a first bonding layer in contact with the first rigid substrate and the flexible substrate.

18. The camera apparatus of claim 17,
wherein the first bonding layer is be disposed in a separation space positioned between the flexible substrate and the first rigid substrate in the optical axis direction.

19. The camera apparatus of claim 17,
wherein at least a portion of the first bonding layer does not overlap the first groove in the optical axis direction.

20. The camera apparatus of claim 17,
wherein the first bonding layer is disposed only in a portion of the flexible substrate in the main substrate.

* * * * *